United States Patent [19]

Wilson et al.

[11] Patent Number: 5,754,338
[45] Date of Patent: May 19, 1998

[54] STRUCTURED RETROREFLECTIVE SHEETING HAVING A RIVET-LIKE CONNECTION

[75] Inventors: Bruce B. Wilson, Woodbury; Cheryl M. Frey, White Bear Lake, both of Minn.

[73] Assignee: Minnesota Mining and Manufacturing Company, St. Paul, Minn.

[21] Appl. No.: 747,105

[22] Filed: Nov. 8, 1996

Related U.S. Application Data

[63] Continuation-in-part of Ser. No. 625,857, Apr. 1, 1996, abandoned.

[51] Int. Cl.$^6$ .................................................. G02B 5/124
[52] U.S. Cl. .......................... 359/530; 359/529; 428/172
[58] Field of Search .................................. 359/529, 530, 359/546, 900; 428/156, 161, 172, 323, 327, 345–347, 131–133, 137, 147; 264/1.1, 1.6, 1.7, 1.9

[56] References Cited

U.S. PATENT DOCUMENTS

| 3,176,584 | 4/1965 | DeVries et al. |
|---|---|---|
| 3,190,178 | 6/1965 | McKenzie |
| 3,689,346 | 9/1972 | Rowland ........................... 156/245 |

(List continued on next page.)

FOREIGN PATENT DOCUMENTS

| 0 306 161 A2 | 3/1989 | European Pat. Off. |
|---|---|---|
| 0 306 162 A2 | 3/1989 | European Pat. Off. |
| 0 370 347 B1 | 5/1990 | European Pat. Off. |
| 0 508 173 A1 | 10/1992 | European Pat. Off. |
| 0 672 921 A2 | 9/1995 | European Pat. Off. |
| 42 11 415 A1 | 10/1993 | Germany. |
| 2 254 826 | 10/1992 | United Kingdom. |
| 2 255 044 | 10/1992 | United Kingdom. |
| 2 267 865 | 12/1993 | United Kingdom. |
| WO 95/07179 | 3/1995 | WIPO. |
| WO 95/11464 | 4/1995 | WIPO. |
| WO 95/11468 | 4/1995 | WIPO. |
| WO 95/11469 | 4/1995 | WIPO. |

OTHER PUBLICATIONS

N.S. Allen et al., "UV and electron Beam Curable Pre-Polymers and Diluent Monomers: Classification, Preparation and Properties" in *Radiation Curing in Polymer Science and Technology—Vol. I, Fundamentals and Methods:* J.P. Fouassier et al., Eds.; Elsevier Applied Science: London; Chapter 5, pp. 225–261 (1993) (no month).

*Paint and Surface Coatings, Theory and Practice;* R. Lambourne, Ed.; Ellis Horwood: New York; pp. 58–110 (1987) (no month).

"Standard Specifications and Operating Instructions for Glass Capillary Kinematic Viscometers", ASTM Designation: D 446–93, pp. 170–191 (Jan. 1994).

"Standard Test Method for Peel Resistance of Adhesives (T–Peel Test)[1]", ASTM Designation: D 1876–93, pp. 105–107 (May 1993).

*Radiation Curing Primer I: Inks, Coatings and Adhesives;* C. Kallendorf, Ed.; RadTech International North America: Northbrook, IL; Chap. 4, pp. 45–53 (1990) (no month).

(List continued on next page.)

*Primary Examiner*—James Phan
*Attorney, Agent, or Firm*—Robert H. Jordan

[57] ABSTRACT

The present invention provides a retroreflective sheeting including a structured film having an array of structured elements and a sealing film attached to the structured film by a plurality of rivet-like connections perforating the sealing film. Preferably, the rivet-like connections form flanges. The preferred sealing film is a thermoplastic polymer with a ductile yield of at least about 20%. The retroreflective sheetings according to the present invention can also include a seal coat located on the sealing film. In some embodiments, the seal coat can be prepared from a seal coat precursor comprising radiation curable components. The present invention also includes methods of manufacturing the various embodiments of the retroreflective sheetings.

47 Claims, 4 Drawing Sheets

U.S. PATENT DOCUMENTS

| Number | Date | Name | Ref |
|---|---|---|---|
| 3,712,706 | 1/1973 | Stamm . | |
| 3,810,804 | 5/1974 | Rowland | 156/245 |
| 3,811,983 | 5/1974 | Rowland | 156/245 |
| 3,924,929 | 12/1975 | Holmen et al. . | |
| 4,025,159 | 5/1977 | McGrath . | |
| 4,111,876 | 9/1978 | Bailey et al. | 260/29.6 |
| 4,123,140 | 10/1978 | Ryan et al. . | |
| 4,202,600 | 5/1980 | Burke et al. . | |
| 4,202,948 | 5/1980 | Peascoe | 525/70 |
| 4,243,618 | 1/1981 | Van Aram | 264/1 |
| 4,327,130 | 4/1982 | Pipkin | 427/209 |
| 4,332,437 | 6/1982 | Searight et al. . | |
| 4,332,847 | 6/1982 | Rowland | 428/156 |
| 4,345,543 | 8/1982 | Pipkin | 118/106 |
| 4,349,598 | 9/1982 | White | 428/161 |
| 4,387,124 | 6/1983 | Pipkin | 427/356 |
| 4,391,948 | 7/1983 | Falk et al. | 525/57 |
| 4,393,171 | 7/1983 | Bracke et al. | 525/309 |
| 4,393,172 | 7/1983 | Lindner et al. | 525/310 |
| 4,418,120 | 11/1983 | Kealy et al. | 428/343 |
| 4,436,871 | 3/1984 | Staas | 525/64 |
| 4,438,171 | 3/1984 | Wefer | 428/215 |
| 4,440,825 | 4/1984 | Paddock | 428/318.6 |
| 4,442,144 | 4/1984 | Pipkin | 427/355 |
| 4,444,840 | 4/1984 | Wefer | 428/339 |
| 4,444,841 | 4/1984 | Wheeler | 428/339 |
| 4,522,964 | 6/1985 | Lindner et al. | 524/71 |
| 4,528,328 | 7/1985 | Ranade et al. | 525/71 |
| 4,537,933 | 8/1985 | Walker et al. | 525/71 |
| 4,562,229 | 12/1985 | Walker et al. | 525/71 |
| 4,576,850 | 3/1986 | Martens | 428/156 |
| 4,576,860 | 3/1986 | Fink et al. | 428/314.4 |
| 4,587,297 | 5/1986 | Walker et al. | 525/64 |
| 4,588,258 | 5/1986 | Hoopman . | |
| 4,601,861 | 7/1986 | Pricone et al. | 264/1.6 |
| 4,652,274 | 3/1987 | Boettcher et al. | 51/298 |
| 4,653,854 | 3/1987 | Miyata . | |
| 4,672,089 | 6/1987 | Pricone et al. | 524/354 |
| 4,731,414 | 3/1988 | Ting | 525/71 |
| 4,751,138 | 6/1988 | Tumey et al. | 428/323 |
| 4,775,219 | 10/1988 | Appeldorn et al. . | |
| 4,801,193 | 1/1989 | Martin . | |
| 4,831,079 | 5/1989 | Ting | 525/71 |
| 4,880,554 | 11/1989 | Newman et al. | 525/67 |
| 4,880,875 | 11/1989 | Wassmuth et al. | 525/67 |
| 4,885,209 | 12/1989 | Lindner et al. | 428/420 |
| 4,885,335 | 12/1989 | Gallucci et al. | 525/67 |
| 4,894,416 | 1/1990 | Gallucci | 525/74 |
| 4,895,428 | 1/1990 | Nelson et al. . | |
| 4,903,440 | 2/1990 | Larson et al. | 51/298 |
| 4,983,436 | 1/1991 | Bailey et al. | 428/40 |
| 4,985,340 | 1/1991 | Palazzotto et al. | 430/270 |
| 5,055,113 | 10/1991 | Larson et al. | 51/298 |
| 5,064,272 | 11/1991 | Bailey et al. | 359/541 |
| 5,066,098 | 11/1991 | Kult et al. | 359/540 |
| 5,068,285 | 11/1991 | Laughner | 525/67 |
| 5,070,142 | 12/1991 | Giles, Jr. et al. | 525/66 |
| 5,070,665 | 12/1991 | Marrin et al. | 52/239 |
| 5,082,897 | 1/1992 | Udipi | 525/67 |
| 5,104,934 | 4/1992 | Udipi | 525/67 |
| 5,106,919 | 4/1992 | Canova et al. | 525/234 |
| 5,117,304 | 5/1992 | Huang et al. | 359/529 |
| 5,120,788 | 6/1992 | Seitz et al. | 525/85 |
| 5,162,423 | 11/1992 | Neumann et al. | 524/504 |
| 5,196,480 | 3/1993 | Seitz et al. | 525/71 |
| 5,236,472 | 8/1993 | Kirk et al. | 51/298 |
| 5,272,562 | 12/1993 | Coderre | 359/529 |
| 5,306,548 | 4/1994 | Zabrocki et al. | 428/215 |
| 5,310,436 | 5/1994 | Pricone et al. | 156/209 |
| 5,450,235 | 9/1995 | Smith et al. | 359/529 |
| 5,491,586 | 2/1996 | Phillips | 359/530 |
| 5,614,286 | 3/1997 | Bacon, Jr. et al. | 428/161 |

OTHER PUBLICATIONS

R.P. Eckberg, "UV Cure of Epoxysiloxanes" in *Radiation Curing in Polymer Science & Technology; vol. IV;* Fouasser et al., Eds.; Elsevier: New York; Chapter 2, pp. 19–49 (1993). (no month).

*Federation Series on Coating Technology: Radiation Cured Coatings;* Federation of Societies for Coatings Technology: Philadelphia; pp. 7–13 and 24 (Jun. 1986).

W.L. Hensley et al. in *Federation Series on Coating Technology: Amino Resins in Coatings;* Federation of Societies for Coatings Technology: Philadelphia; pp. 5–31 (Dec. 1969).

S. Peeters, "Overview of Dual–Cure and Hybrid–Cure Systems in Radiation Curing" in *Radiation Curing in Polymer Science and Technology; vol. III;* Fouasser et al., Eds.; Elsevier: New York; Chapter 6; pp. 177–217 (1993) (no month).

A. Priola et al., "Factors Influencing the Adhesion Properties of Radiation Curable Coatings on Different Substrates", *XIIIth International Conference in Organic Coatings Science and Technology;* pp. 303–318 (1987). (no month).

"Standard Test Method for Bond or Cohesive Strength of Sheet Plastics and Electrical Insulating Materials", ASTM Designation: D 952 –93; pp. 205–207 (Dec. 1993).

"Standard Test Method for Coefficient of Retroreflection of Retroreflective Sheeting", ASTM Designation: E 810 –94; pp. 818–824 (Apr. 1994).

"Standard Test Method for Tensile Properties of Thin Plastic Sheeting", ASTM Designation: D 882 –75b; pp. 359–365 (Jan. 1976).

STRUCTURED RETROREFLECTIVE SHEETING HAVING A RIVET-LIKE CONNECTION

CROSS-REFERENCE TO RELATED APPLICATIONS

This application is a continuation-in-part of U.S. Ser. No. 08/625,857, filed Apr. 1, 1996, now abandoned.

FIELD OF THE INVENTION

This invention pertains to a structured retroreflective sheeting, and more particularly to a cube-corner retroreflective sheeting having a sealing film and a cube-corner film attached in an interlocking mechanism, with an optional seal coat.

BACKGROUND OF THE INVENTION

Retroreflective sheeting has the ability to redirect incident light towards its originating source. This advantageous property has led to the widespread use of retroreflective sheeting on a variety of articles. Typical examples of retroreflective sheeting are microsphere-based sheeting and structured sheeting, such as cube-corner sheeting.

Microsphere-based sheeting, sometimes referred to as "beaded" sheeting, is well known in the art and employs a multitude of glass or ceramic microspheres, typically at least partially embedded in a binder layer and having associated specular or diffuse reflecting materials (e.g., pigment particles, metal flakes, or vapor coats) to retroreflect incident light. Examples of such retroreflectors are disclosed in U.S. Pat. Nos. 3,190,178 (McKenzie), 4,025,159 (McGrath), and 5,066,098 (Kult).

Structured retroreflectors typically comprise a sheet having a generally planar front surface and an array of structured reflecting elements protruding from the back surface. Cube-corner structured reflecting elements comprise generally trihedral structures that have three approximately mutually perpendicular lateral faces meeting in a single corner. In use, the structured retroreflector is arranged with the front surface disposed generally toward the anticipated location of intended observers. Light incident to the front surface enters the sheet, passes through the body of the sheet to be internally reflected by the faces of the structured elements so as to exit the front surface in a direction substantially toward the light source (i.e., it is retroreflected). Because structured retroreflective sheeting is typically of the cube-corner geometry, it should be understood that references below to cube-corner retroreflective sheeting should, where applicable, be considered as referring generally to structured retroreflective sheeting. Where structured retroreflective sheeting is specifically recited, it should be considered as including cube-corner sheeting and any other structured sheeting useful in retroreflective applications.

The light rays are typically reflected at the structured element faces due to either total internal reflection (TIR), or due to specular reflective coatings such as a vapor-deposited aluminum film. Reflectors relying on TIR require an interface between the faces and a material, typically air, having a lower index of refraction. Examples of cube-corner type reflectors are disclosed in U.S. Pat. Nos. 3,712,706 (Stamm), 4,025,159 (McGrath), 4,202,600 (Burke et al.), 4,243,618 (Van Arnam), 4,349,598 (White), 4,576,850 (Martens), 4,588,258 (Hoopman), 4,775,219 (Appeldorn et al.), and 4,895,428 (Nelson et al.), as well as PCT Publication No. WO 95/11469 (Benson et al.). Typically, such retroreflective sheetings exhibit a retroreflective brightness (i.e., a coefficient of retroreflection) of greater than about 50 candela/lux/square meter.

In applications in which the structured retroreflective sheeting is likely to be exposed to moisture (e.g., outdoors or in high humidity), the structured retroreflective elements must be protected from foreign material such as water, oil, and dirt attaching to the faces of the structured elements resulting in defeating the total internal reflection mechanism essential for retroreflection. Common practice is to use a continuous film (referred to as a sealing film) attached to the structured elements with a discreet pattern, resulting in hermetically sealed cells, as disclosed in U.S. Pat. Nos. 4,025,159 (McGrath) and 5,117,304 (Huang). Conventional sealing films may be single or multilayer thermoplastic or thermoplastic/thermoset films that are attached to the structured surface. The sealing film maintains an air interface at the backside of the structured elements to maintain retroreflectivity due to the lower refractive index. The sealing film also protects the structured element surfaces from degradation caused by environmental exposure.

Conventional sealing films are attached to structured elements with the application of heat and pressure. This is done using an embossing tool on the sealing film, which is in continuous contact with the structured surface, to create a cellular pattern (i.e., cells). The contact areas between the sealing film and the structured element tips do not retroreflect. Additionally, the embossing process often deforms or destroys the structured elements. Reducing the surface area for TIR reduces the overall efficiency of the retroreflector and that reduced efficiency is evidenced by lowered brightness of the sheeting construction.

Durability of structured retroreflective sheeting results, in part, from avoiding water and moisture accumulation in the cells. Sustaining the hermetic seal of these cells to avoid moisture penetration into the cells has proven to be a challenging goal. Thus, a need exists for a more durable hermetic seal for cube-corner retroreflective sheetings and other structured retroreflective sheetings.

SUMMARY OF THE INVENTION

The present invention provides a retroreflective sheeting including a structured film comprising an array of structured elements and a sealing film attached to the structured film by a plurality of rivet-like connections, wherein a first side of the sealing film faces the structured elements and a second side faces away from the structured elements, and further wherein each of the rivet-like connections comprises a perforation in the sealing film through which a portion of the structured film protrudes to attach the sealing film to the structured film. Preferably, the structured retroreflective sheeting includes a cube-corner film comprising an array of cube-corner elements, although structured elements having other shapes and geometries can be used to form a rivet-like connection with the sealing film.

In a further embodiment, the portion of the structured film protruding through the perforation in at least one of the rivet-like connections expands to form a flange proximate the second side of the sealing film. In other embodiments, the rivet-like connections can be located in a predetermined pattern.

In still other embodiments, the sealing film comprises a thermoplastic polymer and has a ductile yield of at least about 20%. In other embodiments, the thermoplastic polymer can be selected from the group consisting of cast polyethers, cast polyesters, cast polyamides, ionomeric ethylene copolymers, plasticized vinyl halide polymers, poly-alpha-olefins, ethylene-propylene-diene copolymers such as ethylene-propylene-nonconjugated diene ternary copolymers grafted with a mixture of styrene and acrylonitrile, as well as other styrene-acrylonitrile copolymers such as styrene-acrylonitrile graft copolymers, acrylonitrile-butadiene-styrene graft copolymers, and extractable styrene-acrylonitrile copolymers, and combinations or blends thereof The retroreflective sheetings according to the present invention can also include a seal coat located on the sealing film. In some embodiments, the seal coat can be prepared from a seal coat precursor comprising radiation curable components, such as acrylates.

The present invention also includes methods of manufacturing the various embodiments of the retroreflective sheetings according to the present invention.

The above and other features of the invention are more fully shown and described in the drawings and detailed description of this invention, where like reference numerals are used to represent similar parts. It is to be understood, however, that the description and drawings (which are not to scale) are for the purposes of illustration only and should not be read in a manner that would unduly limit the scope of this invention.

DETAILED DESCRIPTION OF THE INVENTION

In describing preferred embodiments of the invention, specific terminology will be used for the sake of clarity. The invention, however, is not intended to be limited to the specific terms so selected, and it is to be understood that each term so selected includes all technical equivalents that operate similarly.

Figure 1:
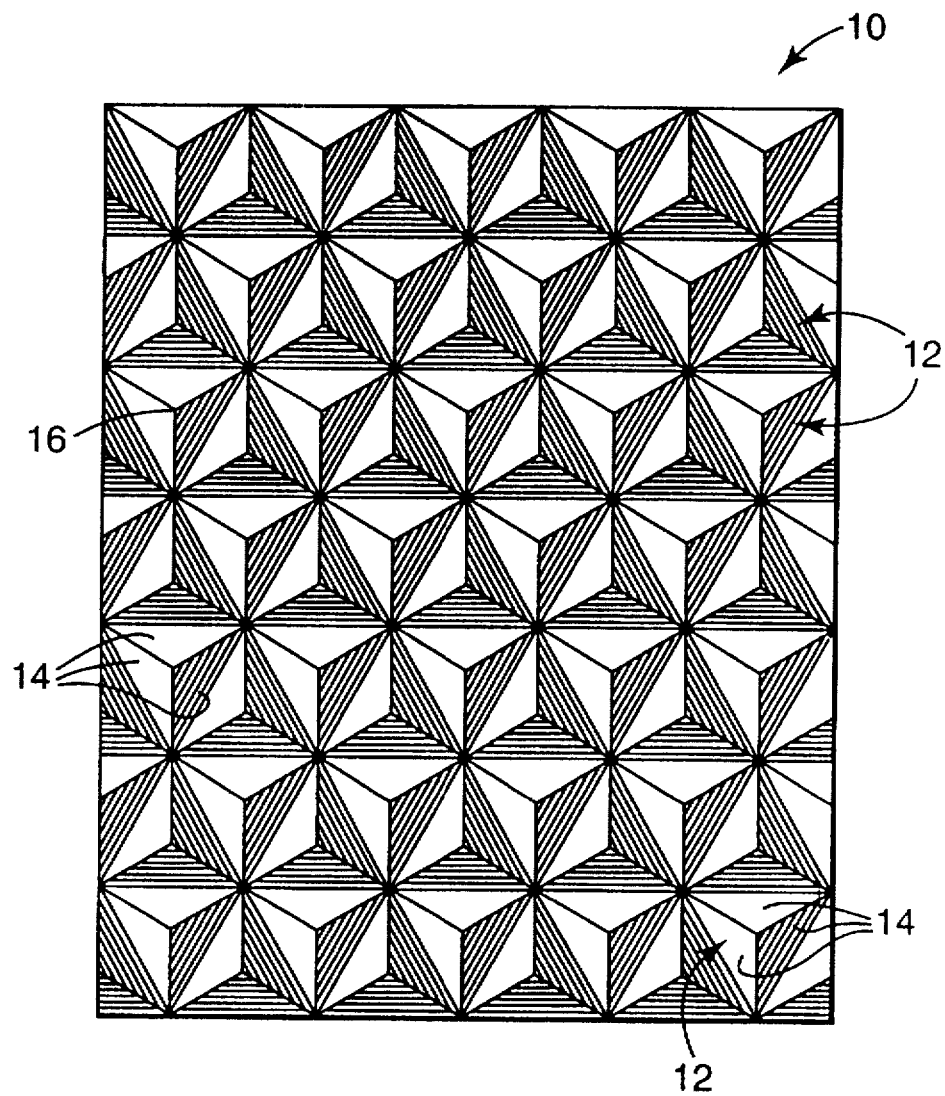
FIG. 1 is a top view of the back side of a cube-corner retroreflective sheetings
Figure 2:
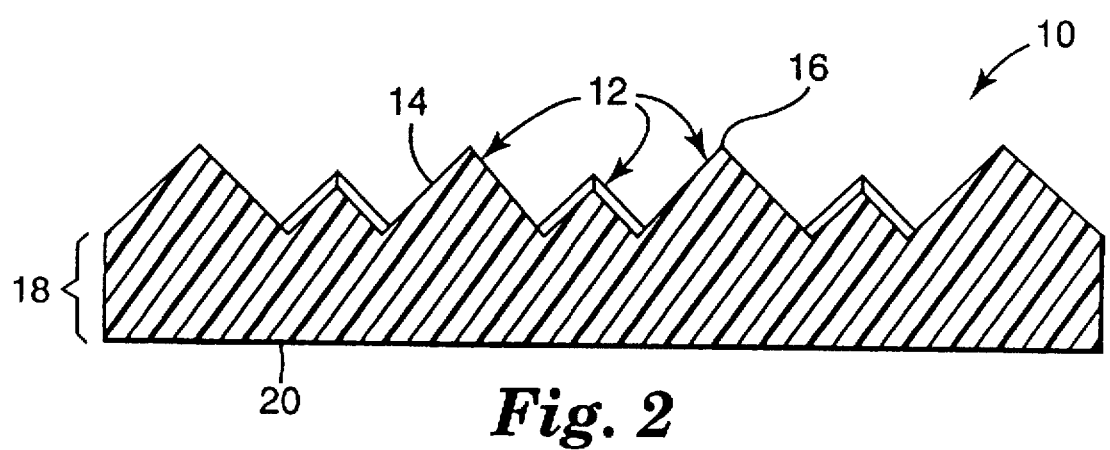
FIG. 2 is a cross-sectional view of the array of cube-corner elements shown in FIG. 1.

FIGS. 1 and 2 schematically illustrate a portion of a typical replicated cube-corner retroreflective sheeting 10. The geometry or configuration of these types of articles are described in, for example, U.S. Pat. Nos. 3,810,804 (Rowland) and 4,588,258 (Hoopman). Referring to both FIGS. 1 and 2, reference 12 generally designates one of the minute cube-corner elements of formations disposed in an array on one side of sheeting 10. Each element 12 has the shape of a trihedral prism with three exposed planar faces 14, substantially perpendicular to one another. The apex 16 of the prism may be vertically aligned with the center of the base, but need not be. The angle between the faces 14 is generally the same for each cube-corner element in the array, and is about 90°. The angle, however, can slightly deviate from 90°, depending on the desired application. Although the apex 16 of each cube-corner element 12 can be vertically aligned with the center of the base of the cube-corner element, it can also be canted away from the center of the base, e.g., such as disclosed in U.S. Pat. No. 4,588,258 (Hoopman). Thus, the present invention is not limited to any particular cube-corner geometry, but is, rather, useful with any cube-corner geometry that can be used as a retroreflector. Furthermore, the structured retroreflective sheeting of the present invention is not limited to the use of cube-corner elements, but other geometries are possible as long as they are retroreflective and capable of forming a rivet-like connection as described in greater detail below. Of the various geometries possible, however, the cube-corner sheeting described in U.S. Pat. No. 4,588,258 (Hoopman) is preferred because it provides wide angle retroreflection among multiple viewing planes.

As is illustrated in FIG. 1, cube-corner elements 12 in sheeting 10 can be all of the same dimensions and aligned in an array or pattern of rows and columns, the bases being in the same plane. If desired, however, different elements in the array can have varying dimensions and orientations. Cube-corner elements 12 surmount body portion 18, the lower or front surface 20 of which is substantially smooth or planar. The body portion 18, which is often referred to as the "land," is typically integral with cube-corner optical elements 12. The dimensions of the land portion of the sheeting relative to the individual cube-corner elements can vary depending on the method chosen for manufacture and, ultimately, the end use of the sheeting.

The structured retroreflective sheeting of the present invention has generally good chemical and mechanical durability, generally good dimensional stability, and a high degree of retroreflectance. It includes a structured retroreflective film comprising a multitude of structured elements, and a sealing film attached to the structured elements to create a cellular pattern generally as taught in, for example, U.S. Pat. No. 4,025,159 (McGrath). The sealing film provides protection for the structured elements from environmental degradation. It also provides a sealed air layer around the structured elements, which retains the mechanism of TIR of the sheeting upon exposure to environmental conditions such as water, or dirt and so on, and results in retention of the optical properties.

Typically, the retroreflective sheeting of the present invention, exhibits a retroreflective brightness, i.e., a coefficient of retroreflection, of greater than about 50, preferably, greater than about 250, and more preferably, greater than about 500 candela/lux/square meter, measured according to ASTM Method E 810-94 at an entrance angle of −4° and an observation angle of −0.2°, when the sheeting is laying flat.

Preferred embodiments of the present invention include a seal coat disposed on the sealing film, which further protects the sealing film and structured elements from environmental attack and provides additional mechanical strength to the sheeting. Either the sealing film or the seal coat can also be used to impart color to the retroreflective sheeting. The seal coat may also fill in indentations caused by embossing and may provide a more compatible surface for a layer of adhesive. Also, certain embodiments of the present invention include an overlay film disposed on the structured film on a surface opposite to that of the sealing film.

An optional backing or an optional adhesive layer can be disposed on the sealing film or the optional seal coat to enable the structured retroreflective sheeting to be secured to a substrate. A variety of heat-activated, solvent-activated, pressure-sensitive or other adhesives can be coated on, or laminated to, the back surface of the sealing film or seal coat, if used, for use in adhering the sheeting to a substrate. A release liner can also be disposed on the adhesive layer, if desired.

In one application, the retroreflective sheetings manufactured according to the present invention can be attached to a signboard for use as interior or exterior signs for, e.g., traffic control, commercial advertising, information, etc.

Figure 3:
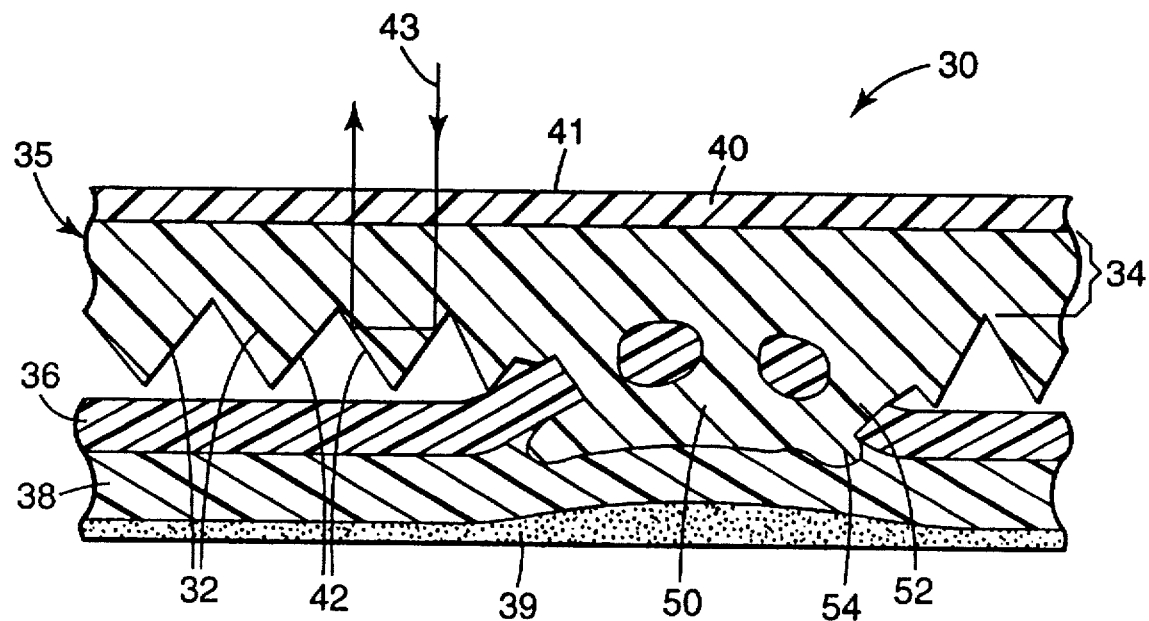
FIG. 3 is a cross-sectional view of a structured retroreflective sheeting according to the present invention having a cube-corner film, sealing film, and rivet-like connections according to the present invention.

In FIG. 3, there is shown an example of one embodiment of a structured retroreflective sheeting 30 of the present invention. In this embodiment, structured retroreflective sheeting 30 comprises a cube-corner film 35 including a multitude of cube-corner elements 32 and a body or "land" portion 34, a sealing film 36, a seal coat 38 (optional), and an overlay film 40 (also optional). In a preferred embodiment, the overlay film 40 is the outermost layer on the front side of the sheeting 30. The land portion 34 of the cube-corner film 35 is distinguished from the overlay film 40 as a layer disposed immediately adjacent to the bases of the cube-corner elements 32. The sealing film 36 and the seal coat 38 typically function to protect the cube-corner elements 32 from environmental degradation and/or to provide additional mechanical integrity to the sheeting. An optional layer 39 of adhesive is also shown for attaching sheeting 30 to a substrate (not shown).

The cube-corner film 35 and the optional overlay film 40 each preferably comprise a light transmissible polymeric material, which for the cube-corner elements 32 and the land portion 34 of the cube-corner film 35 may be the same or different. Light enters the cube-corner sheeting 30 through the front surface 41 of the cube-corner film 35 and the optional overlay film 40. The light then passes through the land portion 34 and strikes the planar faces 42 of the cube-corner elements 32. The light then returns in substantially the same direction from which it came as shown by arrow 43.

In most instances, land portion 34 is integral with cube-corner elements 32. By "integral" it is meant land portion 34 and cube-corner elements 32 are formed in a single operation from a single polymeric material, not two different polymeric layers subsequently united together. The land portion 34, typically, has a thickness of less than about 250 micrometers, and preferably a thickness of about 1–200 micrometers. Although it is preferred to keep the land portion to a minimum thickness (in some instances it may be essentially zero with no intervening portion between the bases of the individual cube corner elements and the overlay film), it is sometimes desired that the sheeting 30 possess some land portion 34 so that a flat interface can be provided between the cube-corner elements 32 and the overlay film 40. The cube-corner elements 32 typically have a height of about 20–500 micrometers, and more typically a height of about 60–175 micrometers. The sealing film 36 typically has a thickness of about 10–250 micrometers, and preferably about 10–200 micrometers, and more preferably about 25–80 micrometers. The seal coat 38 typically has a thickness of about 10–250 micrometers, and preferably about 10–80 micrometers. The overlay film 40 typically has a thickness of about 10–200 micrometers, and preferably about 10–100 micrometers. Although the embodiment of the invention shown in FIG. 3 has a single layered overlay film 40, it is within the scope of the present invention to provide a multilayered overlay film 40 if desired.

The polymeric materials of structured film and overlay film of the invention are light transmissible (in the absence of an added colorant). This means that the polymer is able to transmit at least about 70% of the intensity of the light incident upon it at a given wavelength. Preferably, the polymers have a light transmissibility of greater than about 80%, and more preferably greater than about 90%. Thus, particularly preferred polymers are substantially transparent. The polymeric materials of sealing film and seal coat of the invention may or may not be light transmissible, but they are generally impermeable to materials that can degrade the structured elements.

One or more of the structured film, sealing film, seal coat, and overlay film can be modified to include colorants, such as dyes and/or pigments. As a result, the retroreflective sheeting may exhibit a first color in daylight or any other substantially noncollimated light (i.e., nonretroreflected light) and a second color when illuminated by generally collimated light such as the headlights of a vehicle (i.e., light that is generally retroreflected). For example, if the structured film is colored and the sealing film is colored differently, the daylight color would generally be that of a combination of the sealing film and structured film, whereas the retroreflected color would be that of the structured film. Alternatively, both the structured film and sealing film could be colorless, and light transmissible, and the seal coat could be colored to provide a more diffuse color to the construction. Methods of introducing colorants into the components of the retroreflective sheeting 30 will be known to those skilled in the art.

Figure 4:
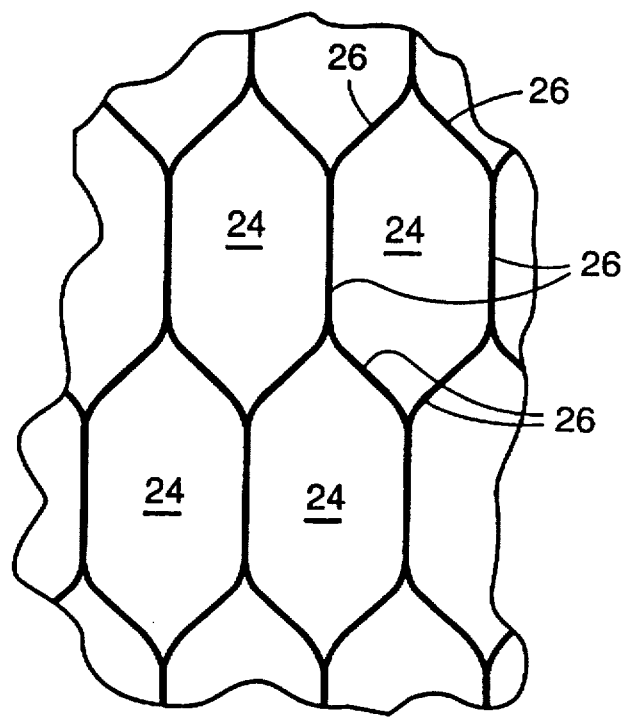
FIG. 4 is a schematic diagram of one pattern of cells formed using the rivet-like connections according to the present invention.

The sealing film 36 is attached to the structured elements, such as the cube-corner elements 32, through unique "rivet-like" connections 50. The connections 50 are preferably generally located in a pattern forming an array of cells 24 as depicted in FIG. 4. Each of the cells 24 are bounded by seal legs 26 that generally correspond to a pattern formed in an embossing roll. The connections 50 are dispersed along the seal legs 26 in a somewhat random manner based on where the sealing film 26 is perforated by the cube-corner elements 32.

It should be understood that the pattern depicted in FIG. 4 is only one example, and that any suitable pattern of connections 50 could be provided to attach the sealing film 36 and the cube-corner film 30 (or other structured film). It is typically preferred that the seal legs 26 intersect to define distinct cells 24, but in some instances, the seal legs 26 may not intersect. It should also be understood that the connections 50 need not necessarily be aligned along any seal leg or any other pattern, but could rather be randomly spaced or provided in a pattern that does not define cells 24 as depicted in FIG. 4.

It is preferred that connections 50 are located such that each of the seal legs 26 forms a substantially hermetic seal resulting in substantially hermetic cells 24. It will be understood, however, the seal legs 26 may not be hermetic in some constructions where, for example, hermetic protection at the structured elements within the cells 24 is not required.

The "rivet-like" connections 50 are formed by destructive interference between the structured film, such as cube-corner film 35, and the sealing film 36. Essentially, the structured film is forced through the sealing film in the area of each connection 50 under temperatures and pressures that cause the structured film to perforate the sealing film and expand horizontally (i.e., flatten). As shown in FIG. 3, each connection 50 typically includes at least one shank portion 52 extending through a perforation in the sealing film 36 and a flange portion 54 that is typically larger than the perforation formed through the sealing film 36. The larger flange portion 54 is typically the result of the expansion of the material from the cube-corner elements 32 that pierce the sealing film 36. By this it is meant that the material from the cube-corner elements flattens such that the flange portion is at least slightly larger than the perforation, whereby the flange portion cannot typically pass back through the perforation without deforming or distorting the perforation. Because the flange portion 54 is larger than its corresponding perforation through the sealing film 36, a portion of the flange lies against the opposing side of the sealing film. It is that interlocking between the shank 52, flange 54, and sealing film 36 that provides a mechanical connection between the sealing film 36 and cube-corner film 35.

It should be understood that a flange 54 may not necessarily be formed through every perforation in the sealing film 36, but that many of the perforations will be accompanied by a flange 54. In those cases where the perforations in the sealing film 36 are closely-spaced, the flanges 54 from adjacent perforations may flow together, which can further strengthen the bond between the cube-corner film 35 and sealing film 36. Herein, "flange" and "flange portion" are used interchangeably, and "shank" and "shank portion" are used interchangeably.

Such a mechanical connection 50 is not seen when the cube-corner film 35 is simply laminated with a sealing film 36 as disclosed in U.S. Pat. No. 4,025,159 (McGrath), for example. It is that interlocking connection, however, that substantially contributes to the durability of the connection between the structured film and the sealing film in the present invention.

In one preferred method, the heat and pressure used to form the connections 50 is applied through the sealing film 36 using a patterned embossing roll heated to a temperature above the temperature at which the sealing film 36 melts. It will be understood that other methods of providing the necessary energy could be used to form connections 50, such as ultrasonic welding, etc. Furthermore, although the cube-corner elements 32 will typically perforate the sealing film 36 to form connections 50 through heat and/or pressure, the sealing film 36 could be perforated in the area of each of the connections 50 through chemical reactions or a combination of mechanical (e.g., thermal) energy and chemical reactions.

In the typical thermal/mechanical method of forming the connections through embossing, the temperature of the embossing roll is at least about 10° C. above the temperature at which the sealing film melts. This temperature is also preferably above the glass transition temperature of the polymer of the structured film (e.g., cube-corner film). Typically, the temperature of the embossing roll is at least about 50° C. above the glass transition temperature of the polymer of the structured film. During processing, the sealing film 36 is melted and perforated by the structured elements, such as the cube-corner elements 32. The tips of the cube-corner elements 32 melt and expand to form the flanged portion 54 of the rivet-like connection 50. Thus, the structured elements can be of shapes or geometries different from that of the cube-corner elements as long as there is a tip or other feature capable of perforating the sealing film and forming a rivet-like connection.

The connections 50 are preferably further protected and sealed by the seal coat 38 applied over the sealing film 36.

The seal coat 38 assists in preventing moisture penetration into the volume defined between the sealing film 36 and the cube-corner elements 32. The materials used for the seal coat 38 and the methods of applying the seal coat 38 are discussed in greater detail below.

Figure 5:
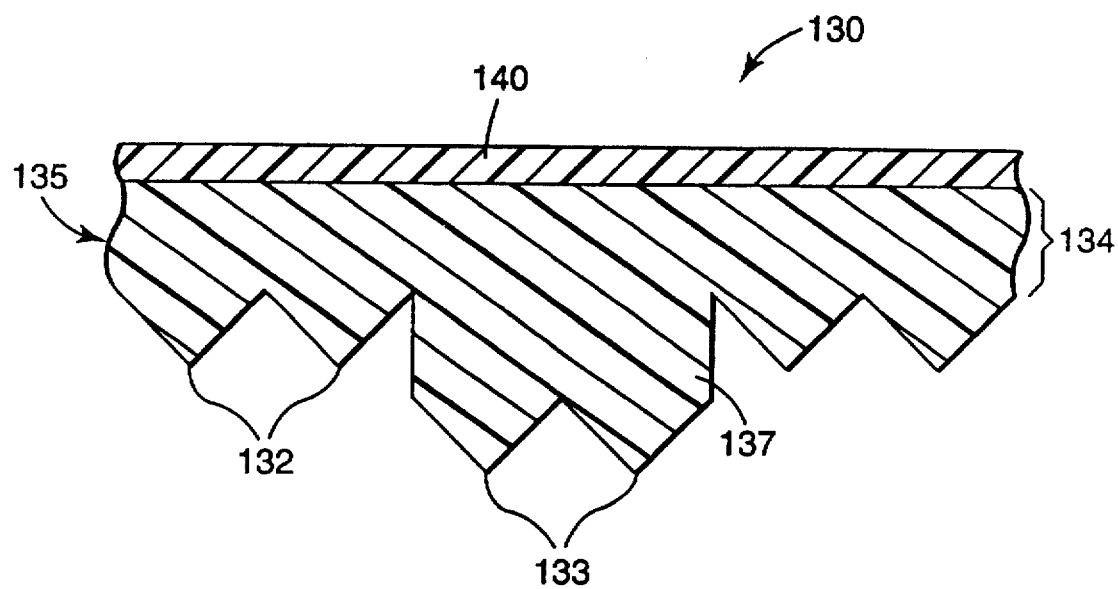
FIG. 5 is a cross-sectional view of an alternative array of cube-corner elements incorporating a raised ridge.
Figure 6:
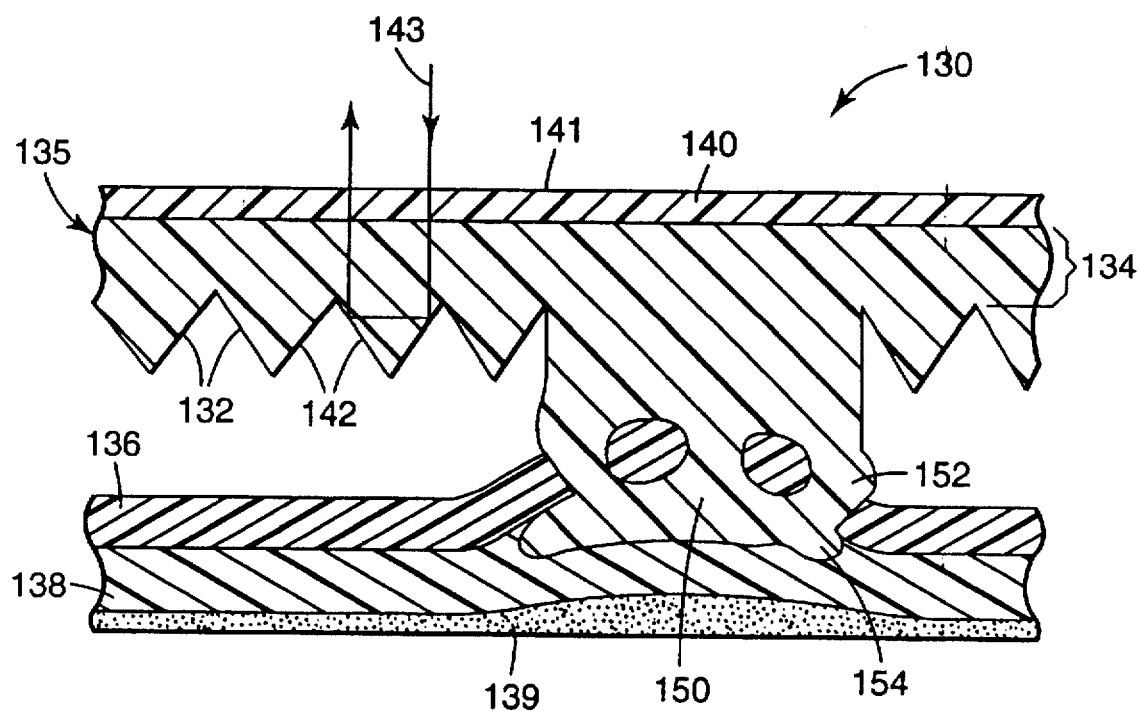
FIG. 6 is a cross-sectional view of a cube-corner retroreflective sheeting using the cube-corner film of FIG. 5.

An alternative embodiment of a cube-corner sheeting 130 is depicted in FIGS. 5 and 6. That embodiment of the cube-corner sheeting 130 includes a cube-corner film 135 consisting of a plurality of cube-corner elements 132 and a land portion 134 to which the elements 132 are attached. The sheeting 130 may also include an overlay film 140 as discussed above with respect to the embodiment depicted in FIG. 3. The primary difference between the cube-corner films 30 (depicted in FIG. 3) and 130 (depicted in FIGS. 5 and 6) is that the film 130 includes a raised structure 137 extending from the land portion 134 of the cube-corner film 135. The raised structure 137 preferably includes perforating elements 133 on its surface that are shaped to perforate the sealing film 136 to form rivet-like connections 150 in much the same manner as described above with respect to the structured elements 32 of the cube-corner film 30.

As best depicted in FIG. 6, when the sealing film 136 and cube-corner film 130 are forced together at the proper temperatures and pressures, the elements 133 perforate the sealing film 136 and form "rivet-like" connections 150 having shank portions 152 extending through the perforations and flange portions 154 similar to those formed in the embodiment depicted in FIG. 3.

Figure 7:
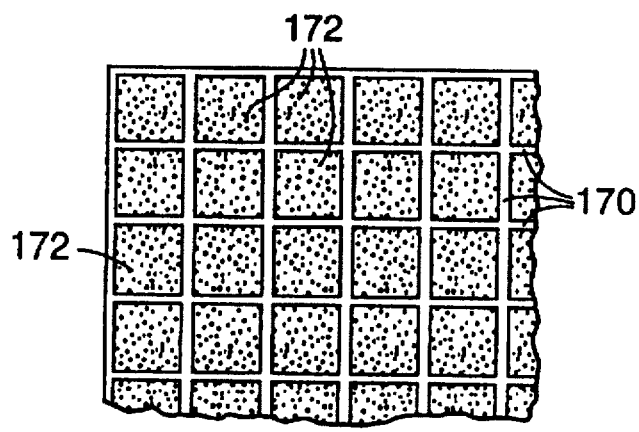
FIG. 7 is a plan view of one pattern of raised structures in a cube-corner film useful in manufacturing retroreflective sheeting according to the present invention.

Referring now to FIG. 7, the raised structure 137 can be provided as ridges 170 in a pattern as shown, where the ridges 170 define areas 172 in which the structured elements (not shown on this scale) are located. Although a repeating pattern of raised ridges 170 is a preferred embodiment of the raised structure 137, it should be understood that the raised structure 137 may be provided as ridges that do not intersect and that may also be randomly oriented. As a further alternative, the raised structure 137 could be provided as unconnected plateaus rising above the land portion 134. In such an embodiment, the plateaus may be located in a patterned array or they may be randomly dispersed over the surface of the cube-corner film 135. Structured retroreflective sheeting with raised structures and methods of manufacturing them are described in, for example, U.S. Pat. No. 3,924,929 (Holmen et al.) and PCT Publication No. WO 95/11469 (Benson et al.). The perforating elements 133 elements on the raised structure 137 should be capable of forming a rivet-like connection, and may also be retroreflective.

One advantage of including a raised structure 137 in the cube-corner film 130 is that it provides additional spacing between the cube-corner elements 132 between the structure 137. That additional space is useful to insure that the tips of the cube-corner elements 132 do not contact the sealing film 136. If those tips do contact the sealing film 136, the refractive index differential needed for total internal reflection may be destroyed in the contact area, allowing light to refract out of the cube-corner elements 132—thereby reducing the efficiency of the retroreflective sheeting 130.

Figure 8:
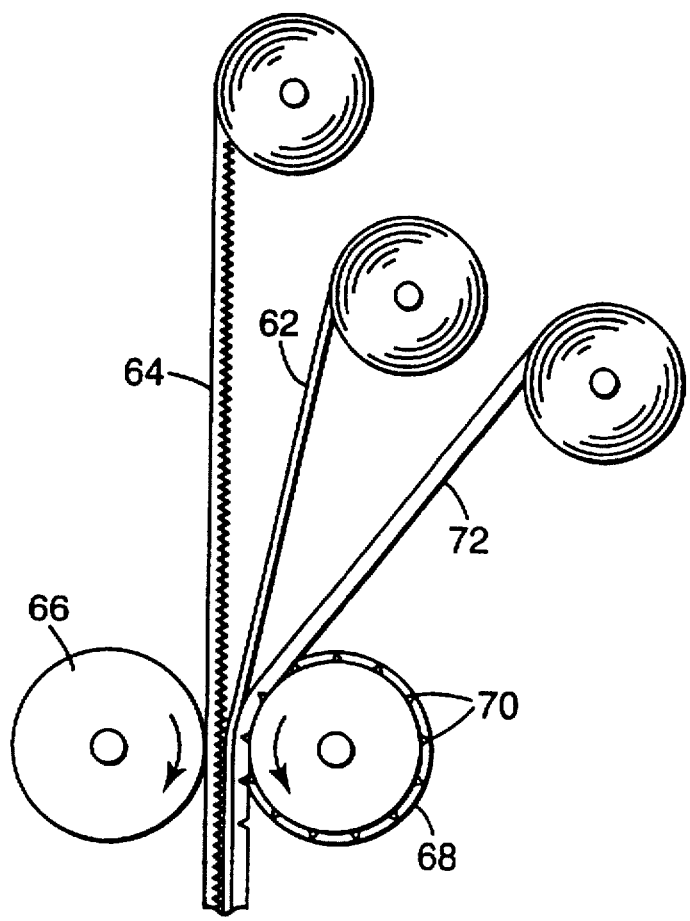
FIG. 8 is a schematic diagram of one method of manufacturing structured retroreflective sheeting according to the present invention.

FIG. 8 depicts one method of manufacturing retroreflective sheeting according to the present invention using web-fed equipment. In the depicted method, sealing film 62 is attached to structured film 64 by passing the two films between nip roller 66 and embossing thermal roller 68. The structured film is adjacent to nip roller 66 with the structured element tips (e.g., cube tips) facing toward embossing roller 68. Sealing film 62 is adjacent to the structured element tips.

A suitable pressure is applied to the components over a raised embossing pattern 70 carried on the surface of embossing roller 68. The counter-force nip roller is preferably a sufficiently hard rubber smooth surfaced roller, for example a 40–80 durometer roller. The embossing roller is patterned steel, for example, which is used to exert pressure into the material being welded only at the point of raised pattern 70. Both embossing roller 68 and hard durometer roller 66 are heated to suitable temperatures depending upon the composition of polymers used in the two layers.

Sealing film 62 is melted and penetrated by the tips of the structured elements, which are then melted and flanged to form rivet-like connections 50 as shown in FIG. 3. As described in connection with FIG. 4, the connections 50 can be arranged in any suitable manner.

To protect the embossing roller 68, an isolation film 72 can be disposed between sealing film 60 and embossing roller 68. Isolation film 72 is typically polyethylene terephthalate about 5–200 micrometers thick, and more often about 10–20 micrometers thick. This arrangement allows the heat and pressure to be transmitted through the polyethylene terephthalate film to melt the sealing film and the cube tips resulting in the rivet-like connection. Other films and other film thicknesses can be used as long as heat and pressure can be transmitted through the material from the embossing roller to the sealing film without melting the isolation film. For example, poly(tetrafluoroethylene) can be used, as well as other materials having a melt temperature of greater than about 230° C.

For a preferred method of making the sheeting of the present invention, the films may be pre-heated before embossing. The embossing roller surface temperature is about 150°–325° C., more preferably about 170°–270° C. The rubber roller surface temperature is about 70°–120° C., more preferably about 85°–100° C. The nip force between rollers is about 100–200 Pascals, and more preferably 130–170 Pascals. At the above conditions, the web speed can be up to about 10 meters/minute, but it will be understood that preheating the films and or adjusting the roll temperatures and nip forces may allow faster operation. Furthermore, it will be understood by one of skill in the art that exact temperatures, pressures, and web speeds will depend on the materials used.

Structured Retroreflective Film

The polymeric materials of the structured elements (e.g., cube-corner elements), and preferably the land portion, are thermoplastic, and tend to be hard, rigid materials with a high index of refraction (relative to other polymers) such that the resultant products possess highly efficient retroreflective properties as well as sufficient durability and weatherability. Herein, the term "thermoplastic" is used in its conventional sense to mean a material that softens when exposed to heat and returns to its original condition when cooled.

Suitable polymeric materials of the structured elements are thermoplastic materials with a relatively high index of refraction, a relatively high glass transition temperature (Tg), as well as a melt temperature (Tm) that is higher than that of the material of the sealing film. Typically, the index of refraction of the polymer of the structured elements is at least about 1.5. Typically, the Tg is greater than about 100° C., and preferably greater than about 120° C. Typically, the Tm of the polymer of the structured elements is greater than about 30° C. higher than the Tm of the polymer of the sealing film, which is discussed below. This difference in the melt temperatures of the sealing film and the structured elements is necessary for formation of the rivet-like connection described above. Preferably, it is about 50° C. higher, and more preferably about 80° C. higher, than the Tm of the polymer of the sealing film. Typically, the polymer used in the sealing film has a melt temperature (Tm) that is greater than about 25° C., and preferably greater than about 80° C. More preferably, the Tm of the polymer used in the sealing film is about 80°–200° C., and most preferably about 80°–140° C.

Generally, the thermoplastic polymers used in the structured elements are amorphous or semi-crystalline. In embodiments in which there is no overlay film or seal coat used, the thermoplastic polymers used in the structured elements, and preferably the land portion, are chemically and mechanically durable such that they resist degradation from environmental elements. The polymeric materials used in the land portion of the structured film, as indicated above, can be the same as the polymers that are employed in the structured elements.

Examples of thermoplastic polymers that can be used in the structured elements include, but are not limited to: acrylic polymers such as poly(methyl methacrylate); polycarbonates; polyimides; cellulosics such as cellulose acetate, cellulose (acetate-co-butyrate), cellulose nitrate; polyesters such as poly(butylene terephthalate), poly(ethylene terephthalate); fluoropolymers such as poly (chlorofluoroethylene), poly(vinylidene fluoride); polyamides such as poly(caprolactam), poly(amino caproic acid), poly(hexamethylene diamine-co-adipic acid), poly(amide-co-imide), and poly(ester-co-imide); polyetherketones; poly (etherimide); polyolefins such as poly(methylpentene); poly (phenylene ether); poly(styrene) and poly(styrene) copolymers such as poly(styrene-co-acrylonitrile), poly (styrene-co-acrylonitrile-co-butadiene); silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a polyimide and acrylic polymer blend, and a poly(methylmethacrylate) and fluoropolymer blend.

Preferred thermoplastic polymers for the structured elements include acrylic polymers, polycarbonates, polyimides, and mixtures thereof. These polymers are preferred for one or more of the following reasons: impact resistance; dimensional stability; thermal stability; environmental stability; clarity; excellent release from the tooling or mold; and high refractive index. The most preferred polymer for the structured elements is a polycarbonate such as bisphenol A polycarbonate, which is available under the trade designations MOBAY MAKROLON 2407 and 2507 from Mobay Corp., Pittsburgh, Pa., and LEXAN 123R from General Electric Co., Pittsfield, Mass.

The polymeric materials used in the structured film of the present invention can include additives such as acid scavengers and UV absorbers. These are particularly useful to prevent degradation of the polymeric material during processing and upon exposure to environmental conditions (e.g., UV radiation). Examples of acid scavengers for polycarbonates include phosphite stabilizers. Examples of UV absorbers include derivatives of benzotriazole such as those available under the trade designations TINUVIN 327, 328, 900, 1130, and TINUVIN-P from Ciba-Geigy Corporation, Ardsley, N.Y.; chemical derivatives of benzophenone such as those available under the trade designations UVINUL-M40, 408, and D-50 from BASF Corporation, Clifton, N.J., and SYNTASE 800 (2-hydroxy-4-n-octyl benzophenone) from Great Lakes Chemical, West Lafayette, Ind.; and chemical derivatives of diphenylacrylate such as those available under the trade designations UVINUL-N35 and 539 from BASF Corporation of Clifton, N.J. Certain polymeric materials include phosphite stabilizers and/or UV absorbers when purchased from the manufacturer.

Other additives, such as colorants, light stabilizers, free radical scavengers or antioxidants, processing aids such as antiblocking agents, releasing agents, lubricants, and the like can also be added to the polymeric materials of the structured layer. These additives can be included in the polymeric materials of the structured layer in amounts to achieve the desired result, which can be readily determined by one of skill in the art.

The particular colorant selected, of course, depends on the desired color of the sheeting. If a colorant is used, it should not undesirably impair the transparency of the retroreflective sheeting. Colorants can include dyes and/or pigments. They typically are used in an amount of about 0.01–2.0 wt-%, preferably about 0.01–0.5 wt-%, based on the total weight of the structured film.

Light stabilizers that can be used include hindered amines, which are typically used at about 0.5–2.0 wt-%, based on the total weight of the structured film. A wide variety of hindered amine light stabilizers can be used to advantage. Examples include 2,2,6,6-tetraalkyl piperidine compounds, as well as those available under the trade designations TINUVIN-144, 292, 622, 770, and CHIMASSORB-944 from the Ciba-Geigy Corp., Ardsley, N.Y.

Free radical scavengers or antioxidants can be used, typically, at about 0.01–0.5 wt-%, based on the total weight of the structured film. Suitable antioxidants include hindered phenolic resins such as those available under the trade designations IRGANOX-1010, 1076, and 1035, as well as MD-1024 and IRGAFOS-168 from the Ciba-Geigy Corp., Ardsley, N.Y.

Small amounts of other processing aids, typically no more than one weight percent of the polymer resins, can be added to improve processibility. Useful processing aids include fatty acid esters, or fatty acid amides available from Glyco Inc., Norwalk Conn., as well as metallic stearates available from Henkel Corp., Hoboken, N.J.

A variety of techniques and methods are known for fabrication of structured retroreflective articles. For example, the structured film of the retroreflective sheetings of the invention can be made by forming a plurality of structured elements from a light transmissible material, using a tool having a molding surface with a plurality of cavities suitable for forming structured elements. If desired, an overlay film can be secured to the base of the structured element to function as a land, or it can be secured to the land portion of a structured film formed with a land. These steps can be carried out according to a variety of known methods for making structured retroreflective sheeting such as those disclosed in, for example, U.S. Pat. Nos. 3,689,346 (Rowland), 3,811,983 (Rowland), 4,332,847 (Rowland), 4,601,861 (Pricone et al.), and 5,450,235 (Smith et al.).

Sealing Film

In the structured reflective sheeting of the present invention, a sealing film 36 (FIG. 3) is used behind the structured film. The sealing film 36 maintains an air space around a majority of the structured elements. Because the index of refraction for air is lower than the index of refraction for the material used in the structured elements, total internal reflection is fostered to provide the desired reflectivity. The sealing film 36 also serves as a barrier for foreign materials such as water, oil, dust, etc., and can provide mechanical strength to the construction.

Suitable polymeric materials used in the sealing film are thermoplastic materials that are generally resistant to degradation by weathering (e.g., UV light, moisture) so that the retroreflective sheeting can be used for long-term outdoor applications. Because it may also serve as a substrate for coating with a seal coat and/or adhesive for mounting the construction to a base such as an aluminum plate, the thermoplastic polymeric material should be chosen such that it adheres well to the seal coat or adhesive. If an opaque or colored sealing film is desired, the polymeric material used for the sealing film should also be compatible with various pigments and/or dyes.

Suitable thermoplastic polymers for use in the sealing film generally retain their physical integrity at the temperatures at which the sealing film is applied to the structured film. By this it is meant that the sealing film is only melted and/or penetrated at the bonding sites between the sealing film and the structured film. It also preferably has a ductile yield of at least about 20%, more preferably at least about 50%, prior to ultimate failure (i.e., permanent deformation). Particularly preferred materials have a ductile yield of at least about 70% prior to ultimate failure. That is, upon ultimate failure, the sealing film will stretch and remain permanently deformed as a result of the forces generated from stretching. As a result, the sealing film of the present invention has less contact with the structured element tips than in constructions having a less ductile sealing film. The reduced contact maintains the air space about the structured elements to foster total internal reflection and reduce leakage through the elements. This provides a more efficient retroreflector, as evidenced by increased "brightness" of the sheeting construction. It also provides for increased transparency in the seal legs. Such sealing films can be referred to as "yielding" sealing films. For comparison, an example of a nonyielding sealing film is a biaxially oriented polyethylene terephthalate film.

Examples of thermoplastic polymers suitable for use in the yielding sealing film include, but are not limited to, materials from the following classes: cast polyethers; cast polyesters; cast polyamides; ionomeric ethylene copolymers such as poly(ethylene-co-methacrylic acid) with sodium or zinc ions, which are available under the trade designations SURLYN-8920 and SURLYN-9910 from E.I. duPont de Nemours, Wilmington, Del.; plasticized vinyl halide polymers; poly-alpha-olefins; polymers of ethylene-propylene-diene monomers ("EPDM"), including ethylene-propylene-nonconjugated diene ternary copolymers grafted with a mixture of styrene and acrylonitrile (also known as acrylonitrile EPDM styrene or "AES"); styrene-acrylonitrile ("SAN") copolymers including graft rubber compositions such as those comprising a crosslinked acrylate rubber substrate (e.g., butyl acrylate) grafted with styrene and acrylonitrile or derivatives thereof (e.g., alpha-methyl styrene and methacrylonitrile) known as "ASA" or acrylate-styrene-acrylonitrile copolymers, and those comprising a substrate of butadiene or copolymers of butadiene and styrene or acrylonitrile grafted with styrene or acrylonitrile or derivatives thereof (e.g., alpha-methyl styrene and methacrylonitrile) known as "ABS" or acrylonitrile-butadiene-styrene copolymers, as well as extractable styrene-acrylonitrile copolymers (i.e., nongraft copolymers) also typically referred to as "ABS" polymers; and combinations or blends thereof. As used herein, the term "copolymer" should be understood as including terpolymers, tetrapolymers, etc.

Preferred polymers for use in the sealing film are within the styrenic family of multiphase copolymer resins (i.e., a multiphase styrenic thermoplastic copolymer of immiscible monomers) referred to above as AES, ASA, and ABS, and combinations or blends thereof Such polymers are disclosed in U.S. Pat. Nos. 4,444,841 (Wheeler), 4,202,948 (Peascoe), and 5,306,548 (Zabrocki et al.). The blends may be in the form of a multilayered film where each layer is a different resin, or physical blends of the polymers which are then extruded into a single film. For example, ASA and/or AES resins can be coextruded over ABS. Multiphase AES, ASA, and ABS resins are used in a variety of applications in which they are used alone, together, or in combination with a variety of other resins to make moldable products such as garden furniture, boat hulls, window frames, and automotive body parts, for example.

Particularly preferred polymers for use in the sealing film for preparation of the rivet-like connection are the multiphase AES and ASA resins, and combinations or blends thereof Such polymers contribute to retention of the peel strength of the retroreflective sheeting with time. The AES resins, which contain acrylonitrile, EPDM, and styrene, are particularly desirable because they can adhere to a wide variety of polymer types when melted, such as polycarbonates, polymethylmethacrylates, polystyrene, urethane acrylics, and the like. Commercially available AES and ASA resins, or combinations thereof, include, for example, those available under the trade designations ROVEL from Dow Chemical Company, Midland, Mich., and LORAN S 757 and 797 from BASF Aktiengesellschaft, Ludwigshafen, Fed. Rep. of Germany), CENTREX 833 and 401 from Bayer Plastics, Springfield, Conn., GELOY from General Electric Company, Selkirk, N.Y., VITAX from Hitachi Chemical Company, Tokyo, Japan. It is believed that some commercially available AES and/or ASA materials also have ABS blended therein. Commercially available SAN resins include those available under the trade designation TYRIL from Dow Chemical, Midland, Mich. Commercially available ABS resins include those available under the trade designation CYOLAC such as CYOLAC GPX 3800 from General Electric, Pittsfield, Mass.

The sealing film can also be prepared from a blend of one or more of the above-listed materials that form a yielding sealing film and one or more thermoplastic polymers that themselves produce nonyielding sealing films (i.e., nonductile sealing films, which can be elastomeric or brittle materials). Examples of such thermoplastic polymers that can be blended with the above-listed yielding materials include, but are not limited to, materials from the following classes: biaxially oriented polyethers; biaxially oriented polyesters; biaxially oriented polyamides; acrylic polymers such as poly(methyl methacrylate); polycarbonates; polyimides; cellulosics such as cellulose acetate, cellulose (acetate-co-butyrate), cellulose nitrate; polyesters such as poly(butylene terephthalate), poly(ethylene terephthalate); fluoropolymers such as poly(chlorofluoroethylene), poly(vinylidene fluoride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); aliphatic and aromatic polyurethanes; poly(phenylene ether); poly(phenylene sulfide); atactic poly(styrene); cast syndiotactic polystyrene; polysulfone; silicone modified polymers (i.e., polymers that contain a small weight percent (less than 10 weight percent) of silicone) such as silicone polyamide and silicone polycarbonate; acid functional polyethylene copolymers such as poly(ethylene-co-acrylic acid) and poly(ethylene-co-methacrylic acid), poly(ethylene-co-maleic acid), and poly(ethylene-co-fumaric acid); fluorine modified polymers such as perfluoropoly(ethyleneterephthalate); and mixtures of the above polymers such as a polyimide and acrylic polymer blend, and a poly(methylmethacrylate) and fluoropolymer blend. Such "nonyielding" thermoplastic polymers can be combined with the yielding thermoplastic polymers in any amount desired, as long as the resultant film preferably has a ductile yield of at least about 20%, and more preferably at least about 50%, prior to ultimate failure. Examples of a combination of a yielding/nonyielding material are polycarbonate/ABS resins such as those available under the trade designations PULSE 1350 and 1370 from Dow Chemical Company, Midland, Mich.

These polymer compositions may include other ingredients including UV stabilizers and antioxidants such as those available from Ciba-Geigy Corp., Ardsley, N.Y., under the trade designation IRGANOX, fillers such as talc, reinforcing agents such as MICA or glass fibers, fire retardants, antistatic agents, mold release agents such as fatty acid esters available under the trade designations LOXIL G-715 or LOXIL G-40 from Henkel Corp., Hoboken, N.J., or WAX E from Hoechst Celanese Corp., Charlotte, N.C. Colorants, such as pigments and dyes, can also be incorporated into the polymer compositions of the sealing film. Examples of colorants include rutile $TiO_2$ pigment available under the trade designation R960 from DuPont de Nemours, Wilmington, Del., iron oxide pigments, carbon black, cadmium sulfide, and copper phthalocyanine. Often, the above-identified polymers are commercially available with one or more of these additives, particularly pigments and stabilizers. Typically, such additives are used in amounts to impart desired characteristics. Preferably, they are used in amounts of about 0.02–20 wt-%, and more preferably about 0.2–10 wt-%, based on the total weight of the polymer composition.

For effective formation of the rivet-like connection, the thickness of the sealing film is no greater than the height of the structured retroreflective elements. Typically, the height of the structured elements is less than about 500 micrometers, and preferably less than about 200 micrometers. Typically, the sealing film thickness is less than about 250 micrometers, preferably less than about 200 micrometers, and more preferably, about 25–80 micrometers. The minimum thickness of the sealing film is generally dictated by extrusion techniques, and is typically greater than about 10 micrometers, and preferably, greater than about 25 micrometers. Such thin films can be prepared, for example, using the extrusion process detailed in copending U.S. patent application Ser. No. 08/626,709, entitled EXTRUDING THIN MULTIPHASE POLYMER FILMS (Attorney Docket No. 52496USA3A), filed Apr. 1, 1996.

Seal Coat

Seal coat 38 (FIG. 3) is an oligomeric or polymeric material used to coat sealing film 36 (FIG. 3). The seal coat is prepared from a seal coat precursor that is applied as a fluid capable of flowing sufficiently so as to be coatable, and then solidifying to form a film. The solidification can be achieved by curing (i.e., polymerizing and/or crosslinking) and/or by drying (e.g., driving off a liquid), or simply upon cooling. The seal coat precursor can be an organic solvent-borne, water-borne, or 100% solids (i.e., a substantially solvent-free) composition. That is, the seal coat may be formed from a 100% solids formulation or it may be coated out of a solvent (e.g., a ketone, tetrahydrofuran, or water) with subsequent drying and/or curing. Preferably, the seal coat precursor is a 100% solids formulation, which is substantially solvent-free (i.e., less than about 1 wt-%). By this it is meant that there is less than about 1 wt-% nonreactive diluent (as defined below) present in the seal coat precursor. Thus, the seal coat precursor can simply dry to form a coating, or the components of the seal coat precursor can polymerize and/or crosslink using a wide variety of curing mechanisms (e.g., oxidative cure as a result of oxygen in the air, thermal cure, moisture cure, high energy radiation cure, condensation polymerization, addition polymerization, and combinations thereof).

A preferred seal coat precursor is one that is capable of irreversibly forming a cured oligomeric/polymeric material and is often used interchangeably with the term "thermosetting" precursor. The term "thermosetting" precursor is used herein to refer to reactive systems that irreversibly cure upon the application of heat and/or other sources of energy, such as E-beam, ultraviolet, visible, etc., or with time upon the addition of a chemical catalyst, moisture, and the like. The term "reactive" means that the components of the seal coat precursor react with each other (or self react) either by polymerizing, crosslinking, or both, using any of the mechanisms listed above.

Preferred embodiments of the present invention include both a sealing film and a seal coat. The sealing film uses a thermoplastic material to form a substantially mechanical bond with the structured film and seal in air to enhance TIR, whereas the seal coat preferably uses a reactive system to enhance the bonding mechanism and provide a better seal. Although U.S. Pat. No. 4,025,159 (McGrath) teaches that a more durable bond can be formed with a heat seal mechanism combined with a reactive seal mechanism, both mechanisms occur in one layer of material. This does not allow for the versatility of the present invention, which separates the thermal seal mechanism from the reactive seal mechanism into separate layers. That is, by separately optimizing the sealing film and seal coat formulations, opacity, flexibility, durability, strength, etc., of the retroreflective sheeting can be varied for the desired end use. It should be understood, however, that the binder material used in U.S. Pat. No. 4,025,159 (McGrath), such as the thermoplastic acrylic terpolymer (methyl methacrylate/ethyl acrylate/isooctyl acrylate) and tetraethylene glycol diacrylate, can be used to form the seal coat in the present invention, as long as a thermoplastic sealing film, particularly a yielding sealing film, is used in combination with the seal coat.

Thus, the seal coat can perform a variety of functions when used in combination with a sealing film. For example, it can impart additional durability, strength, and opacity to the sealing film. The seal coat precursor preferably has a viscosity that allows it to flow into and around the rivet-like connections in the seal legs, and thereby increase the opacity in this area, as well as bond to the structured element tips (e.g., cube tips), thus enhancing the hermetic seal of the construction. When a yielding sealing film forms a hermetic seal with the structured film, the seal coat precursor does not leak through the perforations in the sealing film and flood the adjacent cube area. The seal coat may also help fill in the indentations caused by embossing the seal film to the structured film, and may provide a more compatible layer for the adhesive composition. Depending on the modulus of the seal coat relative to the sealing film, it may also impart additional flexibility or rigidity to the sheeting construction.

By smoothing out and filling in any indentations in the sealing film 36, the seal coat 38 helps to reduce humidity-induced construction buckling in the bonds between the sheeting 30 and a base such as an aluminum sign plate. Although the construction buckling does not affect the performance of the retroreflective sheeting, it can cause localized areas of delamination between the sheeting and the base. The smoother back surface provided by the seal coat 38, however, can substantially inhibit moisture penetration between the sealing film 36 and/or any adhesive used to bond the sheeting 30 to a sign backing because it reduces or eliminates the pathways used in films which have indentations in the sealing film 36. This is particularly true when the adhesive used to attach the sheeting 30 to the backing is substantially stiff (i.e., when it does not fill in or otherwise conform to and fill in any indentations). In addition, if the seal coat imparts additional rigidity to the sheeting, that additional rigidity alone can also assist in preventing humidity-induced construction buckling by mechanically resisting deformation in the sheeting.

Components selected for use in the seal coat precursor can be used to enhance durability and weatherability of the retroreflective sheeting. In addition, the seal coat precursor preferably has suitable rheology to both coat the sealing film uniformly and also flow around the rivet-like connections. Additional opacity can be obtained by this invention because components of the seal coat precursor can suspend or disperse various pigments at useful concentrations. Depending on the sheeting construction, various components of the seal coat precursor preferably interact with the sealing film and/or structured film materials, particularly in the seal legs, to form a durable bond. The term "interact" refers to a variety of mechanisms of interaction, such as surface roughening, dissolution, or interpenetration of the polymer used in the sealing film and/or structured film. There could also be a covalent interaction (e.g., polymerizing and/or crosslinking) between components of the seal coat precursor and the sealing film and/or structured film. The degree of interaction, however, cannot be so great as to destroy the integrity of the retroreflective sheeting.

The seal coat precursors can include reactive or nonreactive components. Nonreactive seal coat precursors typically include polymers or oligomers dissolved or dispersed in nonreactive volatile liquids, although 100% solids systems can also be used. This can include, for example, a thermoplastic coated out of a solvent or coated as a hot melt, and a latex coated out of water. Although they can be used, nonreactive seal coat precursors are not preferred, however. Typically, nonreactive seal coat precursors involve the use of additional processing steps to form the seal coat, such as the removal of any liquid used. This can subject the sheeting to undesirable thermal stress and produce undesirable emissions. Also, nonreactive seal coat precursors do not irreversibly interact with the sheeting (e.g., the structured elements or the sealing film) and thus may not enhance the strength of the construction as much as desired.

Preferably, materials suitable for forming the seal coat are seal coat precursors comprising reactive components, i.e., materials capable of being crosslinked and/or polymerized by a wide variety of mechanisms (e.g., oxidative cure, condensation, moisture cure, radiation or thermal cure of free radical systems, etc., or combinations thereof). Examples include, but are not limited to: amino resins (i.e., aminoplast resins) such as alkylated urea-formaldehyde resins, melamine-formaldehyde resins, and alkylated benzoguanamine-formaldehyde resins; acrylate resins (including acrylates and methacrylates) such as vinyl acrylates, acrylated epoxies, acrylated urethanes, acrylated polyesters, acrylated acrylics, acrylated polyethers, acrylated oils, and acrylated silicones; alkyd resins such as urethane alkyd resins; polyester resins; reactive urethane resins; phenol formaldehyde resins (i.e., phenolic resins) such as resole and novolac resins; phenolic/latex resins;

epoxy resins such as bisphenol epoxy resins; isocyanates; isocyanurates; polysiloxane resins including alkylalkoxysilane resins; reactive vinyl resins; and the like. As used herein, "resins" or "resin systems" refer to polydisperse systems containing monomers, oligomers, polymers, or combinations thereof.

Such reactive seal coat precursor components are capable of being cured by a variety of mechanisms (e.g., condensation or addition polymerization) using, for example, thermal energy, radiation energy, etc. Rapidly acting forms of radiation energy (e.g., requiring application for less than five minutes and preferably for less than five seconds) are particularly preferred. Electron beam (E-beam) radiation is especially desired because of its ability to penetrate heavily pigmented coatings, its speed and efficient use of applied energy, and its ease of control. Other useful forms of radiation energy include ultraviolet/visible light, nuclear radiation, infrared, and microwave radiation. Depending on the particular curing mechanism, the seal coat precursor can further include a catalyst, initiator, or curing agent to help initiate and/or accelerate the polymerization and/or crosslinking process.

Reactive seal coat precursor components capable of being cured by thermal energy and/or time with the addition of catalysts include, for example, phenolic resins such as resole and novolac resins; epoxy resins such as bisphenol A epoxy resins; and amino resins such as alkylated urea-formaldehyde resins, melamine-formaldehyde resins, and alkylated benzoguanamine-formaldehyde resins. The seal coat precursors containing reactive components such as these can include free radical thermal initiators, acid catalysts, etc., depending on the resin system. Examples of thermal free radical initiators include peroxides such as benzoyl peroxide and azo compounds. Typically, such reactive seal coat precursor components need temperatures greater than room temperature (i.e., 25°–30° C.) to cure, although room-temperature curable systems are known.

Resole phenolic resins have a molar ratio of formaldehyde to phenol, based upon weight, of greater than or equal to about 1:1, typically about 1.5:1.0 to about 3.0:1.0. Novolac resins have a molar ratio of formaldehyde to phenol, based upon weight, of less than about 1:1. Examples of commercially available phenolic resins include those known by the designations DUREZ and VARCUM from Occidental Chemicals Corp., Dallas, Tex.; RESINOX from Monsanto, St. Louis, Mo.; and AEROFENE and AEROTAP from Ashland Chemical Co., Columbus, Ohio.

Epoxy resins have an oxirane and are polymerized by ring opening. They can vary greatly in the nature of their backbones and substituent groups. For example, the backbone may be of any type normally associated with epoxy resins, and the substituent groups may be any group free of an active hydrogen atom that is reactive with an oxirane ring at room temperature. Representative examples of acceptable substituents include halogens, ester groups, ether groups, sulfonate groups, siloxane groups, nitro groups, and phosphate groups. One of the most commonly available epoxy resins is the reaction product of diphenylol propane (i.e., bisphenol A) and epichlorhydrin to form 2,2-bis[4-(2,3-epoxypropoxy)phenyl]propane (a diglycidyl ether of bisphenol A). Such materials are commercially available under the trade designations EPON (e.g., EPON 828, 1004, and 1001F) from Shell Chemical Co., and DER (e.g., DER 331, 332, and 334) from Dow Chemical Co., Midland, Mich. Other suitable epoxy resins include glycidyl ethers of phenol formaldehyde novolac available under the trade designation DEN (e.g., DEN 431 and 428) from Dow Chemical Co.

Amino resins (i.e., aminoplast resins) are the reaction product of formaldehyde and an amine. The amine is typically urea or melamine. The most common amino resins are the alkylated urea-formaldehyde resins and melamine-formaldehyde resins, although alkylated benzoguanamine-formaldehyde resins are also known. Melamine-formaldehyde resins are typically used where outdoor durability and chemical resistance are desired. Typically, however, amino resins are not used by themselves because they tend to be brittle. Thus, they are often combined with other resin systems. For example, they can be combined with alkyds, epoxies, acrylics, or other resins that contain functional groups that will react with the amino resin, to take advantage of the good properties of both resin systems.

More preferred seal coat precursors are those that are curable using radiation. These are referred to herein as radiation curable materials. As used herein, "radiation cure" or "radiation curable" refers to curing mechanisms that involve polymerization and/or crosslinking of resin systems upon exposure to ultraviolet radiation, visible radiation, electron beam radiation, or combinations thereof, optionally with the appropriate catalyst or initiator. Typically, there are two types of radiation cure mechanisms that occur—free radical curing and cationic curing. These usually involve one stage curing or one type of curing mechanism. Mixtures of free radical and cationic materials may also be cured to impart desired properties from both systems. Also possible are dual-cure and hybrid-cure systems, as discussed below.

In cationic systems, cationic photoinitiators react upon exposure to ultraviolet/visible light to decompose to yield an acid catalyst. The acid catalyst propagates a crosslinking reaction via an ionic mechanism. Epoxy resins, particularly cycloaliphatic epoxies, are the most common resins used in cationic curing, although aromatic epoxies and vinyl ether based oligomers can also be used. Furthermore, polyols can be used in cationic curing with epoxies as chain-transfer agents and flexibilizers. Also, epoxysiloxanes as disclosed in Eckberg et al., "UV Cure of Epoxysiloxanes," *Radiation Curing in Polymer Science and Technology: Volume IV. Practical Aspects and Applications*, Fouassier and Rabek, eds., Elsevier Applied Science, N.Y., Chapter 2, 19–49 (1993) can be cured using a cationic photoinitiator. The cationic photoinitiators include salts of onium cations, such as arylsulfonium salts, as well as organometallic salts. Examples of cationic photoinitiators are disclosed in U.S. Pat. Nos. 4,751,138 (Tumey et al.) and 4,985,340 (Palazzotti), and European Patent Application Nos. 306,161 and 306,162. A suitable photoinitiator for epoxysiloxanes is the photoactive iodonium salt available under the trade designation UV9310C from GE Silicones, Waterford, N.Y.

In free radical systems, radiation provides very fast and controlled generation of highly reactive species that initiate polymerization of unsaturated materials. Examples of free radical curable materials include, but are not limited to, acrylate resins, aminoplast derivatives having pendant alpha,beta-unsaturated carbonyl groups, isocyanurate derivatives having at least one pendant acrylate group, isocyanate derivatives having at least one pendant acrylate group, unsaturated polyesters (e.g., the condensation products of organic diacids and glycols), polyene/thiol/silicone systems, and other ethylenically unsaturated compounds, and mixtures and combinations thereof Such radiation curable systems are discussed in greater detail in Allen et al., "UV and Electron Beam Curable Pre-Polymers and Diluent Monomers: Classification, Preparation and Properties," *Radiation Curing in Polymer Science and Technology: Volume I. Fundamentals and Methods*, Fouassier and Rabek, eds., Elsevier Applied Science, New York, Chapter 5, 225–262 (1993); *Federation Series on Coatings Technology: Radiation Cured Coatings*, Federation of Societies for Coatings Technology, Philadelphia, Pa., pages 7–13 (1986); and *Radiation Curing Primer I: Inks Coatings, and Adhesives*, RadTech International North America, Northbrook, Ill., pages 45–53 (1990).

Free radical curable systems can be cured using radiation energy, although they can be cured using thermal energy, as long as there is a source of free radicals in the system (e.g., peroxide or azo compound). Thus, the phrase "radiation curable," and more particularly the phrase "free radical curable," include within their scope systems that also can be cured using thermal energy and that involve a free radical curing mechanism. In contrast, the phrase "radiation cured" refers to systems that have been cured by exposure to radiation energy.

Suitable acrylate resins for use in the present invention include, but are not limited to, acrylated urethanes (i.e., urethane acrylates), acrylated epoxies (i.e., epoxy acrylates), acrylated polyesters (i.e., polyester acrylates), acrylated acrylics, acrylated silicones, acrylated polyethers (i.e., polyether acrylates), vinyl acrylates, and acrylated oils. As used herein, the terms "acrylate" and "acrylate-functional" include both acrylates and methacrylates, whether they be monomers, oligomers, or polymers.

Acrylated urethanes are diacrylate esters of hydroxy terminated NCO extended polyesters or polyethers. They can be aliphatic or aromatic, although acrylated aliphatic urethanes are preferred because they are less susceptible to weathering. Examples of commercially available acrylated urethanes include those known by the trade designations PHOTOMER (e.g., PHOTOMER 6010) from Henkel Corp., Hoboken, N.J.; EBECRYL 220 (hexafunctional aromatic urethane acrylate of molecular weight 1000), EBECRYL 284 (aliphatic urethane diacrylate of 1200 molecular weight diluted with 1,6-hexanediol diacrylate), EBECRYL 4827 (aromatic urethane diacrylate of 1600 molecular weight), EBECRYL 4830 (aliphatic urethane diacrylate of 1200 molecular weight diluted with tetraethylene glycol diacrylate), EBECRYL 6602 (trifunctional aromatic urethane acrylate of 1300 molecular weight diluted with trimethylolpropane ethoxy triacrylate), and EBECRYL 8402 (aliphatic urethane diacrylate of 1000 molecular weight) from UCB Radcure Inc., Smyrna, Ga.; SARTOMER (e.g., SARTOMER 9635, 9645, 9655, 963-B80, 966-A80) from Sartomer Co., West Chester, Pa.; and UVITHANE (e.g., UVITHANE 782) from Morton International, Chicago, Ill.

Acrylated epoxies are diacrylate esters of epoxy resins, such as the diacrylate esters of bisphenol A epoxy resin. Examples of commercially available acrylated epoxies include those known by the trade designations EBECRYL 600 (bisphenol A epoxy diacrylate of 525 molecular weight), EBECRYL 629 (epoxy novolac acrylate of 550 molecular weight), and EBECRYL 860 (epoxidized soya oil acrylate of 1200 molecular weight) from UCB Radcure Inc., Smyrna, Ga.; and PHOTOMER 3016 (bisphenol A epoxy diacrylate), PHOTOMER 3038 (epoxy acrylate/tripropylene glycol diacrylate blend), PHOTOMER 3071 (modified bisphenol A acrylate), etc. from Henkel Corp., Hoboken, N.J.

Acrylated polyesters are the reaction products of acrylic acid with a dibasic acid/aliphatic/diol-based polyester. Examples of commercially available acrylated polyesters include those known by the trade designations PHOTOMER 5007 (hexafunctional acrylate of 2000 molecular weight), PHOTOMER 5018 (tetrafunctional acrylate of 1000 molecular weight), and other acrylated polyesters in the PHOTOMER 5000 series from Henkel Corp., Hoboken, N.J.; and EBECRYL 80 (tetrafunctional modified polyester acrylate of 1000 molecular weight), EBECRYL 450 (fatty acid modified polyester hexaacrylate), and EBECRYL 830 (hexafunctional polyester acrylate of 1500 molecular weight) from UCB Radcure Inc., Smyrna, Ga.

Acrylated acrylics are acrylic oligomers or polymers that have reactive pendant or terminal acrylic acid groups capable of forming free radicals for subsequent reaction. Examples of commercially available acrylated acrylics include those known by the trade designations EBECRYL 745, 754, 767, 1701, and 1755 from UCB Radcure Inc., Smyrna, Ga.

Acrylated silicones, such as room temperature vulcanized silicones, are silicone-based oligomers or polymers that have reactive pendant or terminal acrylic acid groups capable of forming free radicals for subsequent reaction. These and other acrylates are discussed in Allen et al., "UV and Electron Beam Curable Pre-Polymers and Diluent Monomers: Classification, Preparation and Properties," *Radiation Curing in Polymer Science and Technology: Volume I. Fundamentals and Methods*, Fouassier and Rabek, eds., Elsevier Applied Science, New York, Chapter 5, 225–262 (1993); *Federation Series on Coatings Technology: Radiation Cured Coatings*, Federation of Societies for Coatings Technology, Philadelphia, Pa., pages 7–13 (1986); and *Radiation Curing Primer I: Inks, Coatings, and Adhesives*, RadTech International North America, Northbrook, Ill., pages 45–53 (1990).

Isocyanurate derivatives having at least one pendant acrylate group and isocyanate derivatives having at least one pendant acrylate group are further described in U.S. Pat. No. 4,652,274 (Boetcher et al.). Examples of isocyanurate resins with acrylate groups include a triacrylate of tris(hydroxy ethyl) isocyanurate.

Radiation curable aminoplast resins have at least one pendant alpha,beta-unsaturated carbonyl group per molecule or oligomer. These unsaturated carbonyl groups can be acrylate, methacrylate, or acrylamide type groups. Examples of resins with acrylamide groups include N-(hydroxymethyl)-acrylamide, N,N'-oxydimethylenebisacrylamide, ortho- and para-acrylamidomethylated phenol, acrylamidomethylated phenolic novolac, glycoluril acrylamide, acrylamidomethylated phenol, and combinations thereof. These materials are further described in U.S. Pat. Nos. 4,903,440 (Larson et al.), 5,055,113 (Larson et al.), and 5,236,472 (Kirk et al.).

Other suitable ethylenically unsaturated resins include monomeric, oligomeric, and polymeric compounds, typically containing ester groups, amide groups, and acrylate groups. Such ethylenically unsaturated compounds preferably have a molecular weight of less than about 4,000. They are preferably esters made from the reaction of compounds containing aliphatic monohydroxy groups or aliphatic polyhydroxy groups and unsaturated carboxylic acids, such as acrylic acid, methacrylic acid, itaconic acid, maleic acid, and the like. Representative examples of acrylate resins are listed elsewhere herein. Other ethylenically unsaturated resins include monoallyl, polyallyl, and polymethallyl esters and amides of carboxylic acids, such as diallyl phthalate, diallyl adipate, and N,N-diallyladipamide, as well as styrene, divinyl benzene, vinyl toluene. Still others include tris(2-acryloyl-oxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

In dual-cure resin systems, the polymerization or crosslinking occur in two separate stages, via either the same or different reaction mechanisms. In hybridcure resin systems, two mechanisms of polymerization or crosslinking occur at the same time on exposure to ultraviolet/visible or E-beam radiation. The chemical curing mechanisms that can occur in these systems include, but are not limited to, radical polymerization of acrylic double bonds, radical polymerization of unsaturated polyesters of styrene or other monomers, air drying of allyl functions, cationic curing of vinyl ethers or epoxies, condensation of isocyanates, and acid-catalyzed thermal curing. Thus, the dual-cure and hybrid-cure systems can combine radiation curing with thermal curing, or radiation curing with moisture curing, for example. A combination of E-beam curing with ultraviolet/visible curing is also possible. Combining curing mechanisms can be accomplished, for example, by mixing materials with two types of functionality on one structure or by mixing different materials having one type of functionality. Such systems are discussed in Peeters, "Overview of Dual-Cure and Hybrid-Cure Systems in Radiation Curing," *Radiation Curing in Polymer Science and Technology: Volume III, Polymer Mechanisms*, Fouassier and Rabek, eds., Elsevier Applied Science, New York, Chapter 6, 177–217 (1993).

Of the radiation curable materials, free radical curable materials are preferred. Of these, the acrylates are particularly preferred for use in the seal coat precursors of the present invention. Examples of such materials include, but are not limited to, mono- or multi-functional acrylates (i.e., acrylates and methacrylates), acrylated epoxies, acrylated polyesters, acrylated aromatic or aliphatic urethanes, acrylated acrylics, acrylated silicones, etc., and combinations or blends thereof These can be monomers or oligomers (i.e., moderately low molecular weight polymers typically containing 2–100 monomer units, and often 2–20 monomer units) of varying molecular weight (e.g., 100–2000 weight average molecular weight). Preferred seal coat precursors include acrylated epoxies, acrylated polyesters, acrylated aromatic or aliphatic urethanes, and acrylated acrylics. More preferred seal coat precursors include acrylated aromatic or aliphatic urethanes, and most preferred seal coat precursors include acrylated aliphatic urethanes.

Free radical radiation curable systems often include oligomers and/or polymers (also often referred to as film formers) that form the backbone of the resultant cured material, and reactive monomers (also often referred to as reactive diluents) for viscosity adjustment of the curable composition. Although the film formers are typically oligomeric or polymeric materials, some monomeric materials are also capable of forming a film. Typically, systems such as these require the use of ultraviolet/visible or E-beam radiation. Ultraviolet/visible curable systems also typically include a photoinitiator. Water or organic solvents can also be used to reduce the viscosity of the system (therefore acting as unreactive diluents), although this typically requires thermal treatment to flash off the solvent. Thus, the seal coat precursors of the present invention preferably do not include water or organic solvents. That is, they are preferably 100% solids formulations.

Preferred seal coat precursors of the present invention include a reactive diluent and a film former. The reactive diluent includes at least one mono- or multi-functional monomeric compound. As used herein, monofunctional means that compound contains one carbon-carbon double bond, and multi-functional means that the compound contains more than one carbon-carbon double bond or another chemically reactive group that can crosslink through condensation. Examples of resins with a carbon-carbon double bond and another chemically reactive group include isocyanatoethyl methacrylate, isobutoxymethyl acrylamide, and methacryloxy propyl trimethoxy silane. Suitable reactive diluents are those typically used in radiation curable systems for controlling viscosity. They are preferably acrylates, although non-acrylates such as n-vinyl pyrrolidone, limonene, and limonene oxide, can also be used, as long as the monomers are ethylenically unsaturated, which provides for their reactivity. The film former includes at least one radiation curable material, such as the mono- or multifunctional oligomeric compounds typically used in radiation curable systems, although thermoplastic polymers can also be used. These thermoplastic polymers may or may not be reactive with the reactive diluent or self-reactive (e.g., internally crosslinkable).

Preferably, the seal coat precursor includes at least one monofunctional monomeric compound and at least one multifunctional oligomeric compound. Most preferably, such seal coat precursors include at least one monofunctional monomeric acrylate having a molecular weight of no greater than about 1000 (preferably, about 100–1000) and at least one multifunctional oligomeric acrylated urethane having a molecular weight of at least about 500, preferably, about 500–7000, and more preferably, about 1000–2000.

Monofunctional monomers typically tend to lower the viscosity of the blend and provide faster penetration into the sealing film and/or structured film. Multifunctional monomers and oligomers (e.g., diacrylates and triacrylates) typically tend to provide more crosslinked, stronger bonds between layers and within the seal coat. Also, depending on their structures, the multifunctional monomers and oligomers can impart flexibility or rigidity to the seal coat. Acrylated oligomers, preferably acrylated urethane oligomers, impart desirable properties to the coating, such as toughness, hardness, and flexibility.

Examples of suitable monofunctional monomers include, but are not limited to, ethyl acrylate, methyl methacrylate, isooctyl acrylate, oxethylated phenol acrylate, isobornyl acrylate, 2-ethylhexyl acrylate, 2-phenoxyethyl acrylate, 2-(ethoxyethoxy)ethyl acrylate, ethylene glycol methacrylate, tetrahydroxy furfuryl acrylate (THF acrylate), caprolactone acrylate, and methoxy tripropylene glycol monoacrylate. Examples of suitable multifunctional monomers include, but are not limited to, triethylene glycol diacrylate, pentaerythritol triacrylate, glycerol triacrylate, glycerol trimethacrylate, glyceryl propoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, polyethylene glycol diacrylate, pentaerythritol tetraacrylate, pentaerythritol tetramethacrylate, and 1,6-hexane diacrylate. Other mono- and multifunctional monomers include vinyl acetate, n-vinyl formamide, and others listed below in Table 1. The monomers are available under the trade designations EBECRYL from UCB Radcure Inc., Smyrna, Ga., PHOTOMER from Henkel Corp., Hoboken, N.J., and SARTOMER from Sartomer Co., West Chester, Pa. Limonene oxide is from Aldrich Chemical Co., Milwaukee, Wis. The n-vinyl pyrrolidinone is from Kodak, Rochester, N.Y.

Examples of suitable acrylated oligomers include, but are not limited to, acrylated epoxies, acrylated polyesters, acrylated aromatic or aliphatic urethanes, acrylated silicones, acrylated polyethers, vinyl acrylates, acrylated oils, and acrylated acrylics. Of these, acrylated aromatic or aliphatic urethanes are preferred, and acrylated aliphatic urethanes are more preferred because of their flexibility and weatherability. Examples of some acrylated aliphatic urethanes (i.e., aliphatic urethane acrylates) include those available under the trade designations PHOTOMER 6010 (MW=1500), from Henkel Corp., Hoboken, N.J.; EBECRYL 8401 (MW= 1000) and EBECRYL 8402 (MW=1000, urethane diacrylate), from UCB Radcure Inc., Smyrna, Ga.; S-9635, S-9645, and S-9655, all of which contain 25% by weight isobornyl acrylate, and are available from Sartomer Co., West Chester, Pa., S-963-B80, which contains 20% by weight 1,6-hexanediol diacrylate and is available from Sartomer Co.; and S-966-A80, which contains 20% by weight tripropylene glycol diacrylate and is available from Sartomer Co.

Preferred reactive monomers (i.e., reactive diluents) are those that interact with (e.g., dissolve or swell) the structured film or the sealing film. More preferred monomers are those that interact with both the structured film (e.g., polycarbonate) and the sealing film (e.g., AES and/or ASA films). Particular monomer/film interactions can be readily screened for interaction by application of a quantity of the monomer solution to the surface of the film. Priola et al., *Proceedings of the XIII International Conference in Organic Coatings Science and Technology*, Athens, Greece, Jul. 7-11, 1987, pp. 308-318, discloses a watch glass test suitable for this purpose. A positive response is a hazing or dissolving of the substrate in question upon exposure to a drop of the monomer, which indicates that the monomer penetrates or swells the substance, or otherwise interacts with it. Examples of monomers that interact with a film made from either the AES material available under the trade designation CENTREX 833 or polycarbonate are given below in Table 1.

TABLE 1

Screening of Monomers for Compatibility With Polycarbonate and AES/ASA

| Monomer | Type of Material | CENTREX 833 | Polycarbonate |
|---|---|---|---|
| EBECRYL 110 | Oxethylated phenol acrylate | yes | yes |
| PHOTOMER 4028 | Bisphenol A ethoxylate diacrylate | none | yes |
| PHOTOMER 4072 | Trimethyol propane propoxylate triacrylate | none | trace |
| PHOTOMER 4149 | Trimethylol propane ethoxylate triacrylate | trace | trace |
| PHOTOMER 8061 | Methoxy tripropylene glycol monoacrylate | trace | yes |
| PHOTOMER 8149 | Methoxy ethoxylated trimethylpropane diacrylate | trace | yes |
| SARTOMER 213 | 1,4-Butanediol diacrylate | yes | yes |
| SARTOMER 238 | 1,6-Hexanediol diacrylate | yes | yes |
| SARTOMER 256 | 2(Ethoxy-ethoxy) ethyl acrylate | yes | yes |
| SARTOMER 268 | Tetraethylene glycol diacrylate | yes | trace |
| SARTOMER 272 | Triethylene glycol diacrylate | yes | yes |
| SARTOMER 285 | Tetrahydroxy furfuryl acrylate | yes | yes |
| SARTOMER 306 | Tripropylene glycol diacrylate | trace | trace |
| SARTOMER 497 | n-Vinyl formamide | yes | yes |
| SARTOMER 506 | Isobornyl acrylate | none | yes |
| SARTOMER 9008 | Alkoxylated trifunctional acrylate | trace | none |
| +Limonene oxide | Limonene oxide | yes | yes |
| −Limonene oxide | Limonene oxide | yes | yes |
| NVP | n-Vinyl pyrrolidinone | yes | yes |

As stated above, a thermoplastic polymer can be used as the film former, either in addition to or in place of the mono- or multi-functional oligomers. Thus, many of the sealing film materials (e.g., the AES and/or ASA materials) discussed above can be used in the seal coat precursor. Preferably, these are used in addition to the mono- or multi-functional oligomers as a secondary film former to control the viscosity and rheology of the seal coat precursor and/or to help reduce the amount of shrinkage of the film. Pellets of the various ASA and/or AES resins available under the trade designation CENTREX for example, are desirable because they will dissolve in a variety of monomers (i.e., reactive diluents), and are radiation curable (e.g., they crosslink upon exposure to ultraviolet/visible radiation). Other thermoplastic polymers can be used, however, that are not reactive either with the reactive diluents or self-reactive. For example, the substantially unreactive thermoplastic acrylate terpolymer used in the binder of U.S. Pat. No. 4,025,159 (McGrath) can be used in the seal coat precursor of the present invention.

The seal coat precursor may contain various solvents other than the diluent monomers discussed above to help solubilize the higher molecular weight reactive resins (e.g., the acrylated oligomers) and/or the thermoplastic polymers of the structured film and/or the sealing film. Such solvents are referred to as nonreactive diluents or nonreactive monomers as they do not significantly polymerize or crosslink with the reactive resins of the seal coat precursor, for example, under the curing conditions of the method of the present invention. Furthermore, such solvents are typically driven off by heat, although complete elimination is not necessarily required. Suitable solvents for this purpose include various ketone solvents, tetrahydrofuran, xylene, and the like. Alternatively, and preferably, however, the seal coat precursor is a 100% solids composition as defined above.

Colorants (i.e., pigments and dyes) can also be included in the seal coat precursor if desired. Examples of suitable colorants include $TiO_2$, phthalocyanine blue, carbon black, basic carbonate white lead, zinc oxide, zinc sulfide, antimony oxide, zirconium oxide, lead sulfochromate, bismuth vanadate, bismuth molybdate, as well as other pigments, particularly opaque pigments disclosed in U.S. Pat. No. 5,272,562 (Coderre). The colorant can be used in an amount to impart the desired color, and can be added to the seal coat precursor in a variety of ways. For example, the colorant may be included in the ASA and/or AES pellets as purchased. Typically, and preferably, a pigment is used in the form of a dispersion in, for example, neopentyl glycol diacrylate (available under the trade designation 9WJ, from Penn Color, Doylestown, Pa.

Preferably, the seal coat precursors include a reactive diluent in an amount of about 5-25 wt-%, based on the weight of the total seal coat precursor. The amounts of the film former and optional pigment in the seal coat precursor depends on the desired opacity, flexibility, viscosity, etc. Preferably, the seal coat precursors include a film former in an amount of about 25-95 wt-%, and pigment in an amount of no greater than about 50 wt-%, based on the total weight of the seal coat precursor.

A photoinitiator is typically included in ultraviolet/visible curable seal coat precursors of the present invention. Illustrative examples of photopolymerization initiators (i.e., photoinitiators) include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. Such photoinitiators include those available under the trade designations DAROCUR 4265 (50:50 blend of 2-hydroxy-2-methyl-1-phenylpropan-1-one and 2,4,6-trimethylbenzoyldiphenylphosphine oxide) and CGI1700 (25:75 blend of bis(2,6-dimethoxybenzoyl)-2,4,4-trimethylpentylphosphine and 2-hydroxy-2-methyl-1-phenylpropan-1-one) available from Ciba-Geigy Corp., Ardsley, N.Y. Typically, a photoinitiator is used in an amount to impart desired reaction rates. Preferably, it is used in an amount of about 0.01–5 wt-%, and more preferably about 0.1–1 wt-%, based on the total weight of the seal coat precursor.

Other additives that can be included within the seal coat precursor are fillers, defoamers, adhesion promoters, flattening agents, wetting agents, slip aids, stabilizers, plasticizers, adhesion promoters, etc. These can be reactive or nonreactive; however, they are typically nonreactive. Examples of reactive plasticizers are available under the trade designations SARBOX SB-600 and SB-510E35 from Sartomer Co. Typically, such additives are used in amounts to impart desired characteristics. Preferably, they are used in amounts of about 0.01–5 wt-%, and more preferably about 0.1–1 wt-%, based on the total weight of the seal coat precursor.

Any suitable method of applying the seal coat precursor to the sealing film can be used in connection with the present invention. Preferably, however, the coating method is one that is capable of causing the seal coat precursor to contact the rivet-like connections and even "fill" the depressions caused by the seal legs. The choice of coating method will depend on the viscosity of the seal coat precursor, the depth of the depressions, the desired thickness of the coating, coating speed, etc. Suitable coating methods include, for example, knife coating, rod coating, and notch bar coating. The thickness of the seal coat will depend on the viscosity and film build of the seal coat precursor, the type of coater used, and the desired final properties. Typically, wet coating thicknesses of about 10–250 micrometers are used. Some useful methods of applying a layer of the seal coat used in the present invention are described in U.S. Pat. Nos. 4,327,130, 4,345,543, 4,387,124, and 4,442,144 (all to Pipkin).

After the seal coat precursor is coated onto the sealing film/structured film construction, it is preferably exposed to an energy source to initiate cure. Examples of suitable and preferred energy sources include thermal energy and radiation energy. The amount of energy depends upon several factors such as the resin chemistry, the dimensions of the seal coat precursor after it is coated, and the amount and type of optional additives, particularly pigment load. For thermal energy, the temperature is about 30° C. to about 100° C. The exposure time can range from about 5 minutes to over 24 hours, longer times being appropriate for lower temperatures.

Suitable radiation energy sources for use in the invention include electron beam, ultraviolet light, visible light, or combinations thereof. Electron beam radiation, which is also known as ionizing radiation, can be used at an energy level of about 0.1–10 Mrad, preferably, at an energy level of about 3–8 Mrad, and more preferably, about 5–6 Mrad; and at an accelerating voltage level of about 75 KeV to about 5 meV, preferably, at an accelerating voltage level of about 100–300 KeV. Ultraviolet radiation refers to nonparticulate radiation having a wavelength within the range of about 200 nanometers to about 400 nanometers. It is preferred that 118–236 watts/cm ultraviolet lights are used. Visible radiation refers to nonparticulate radiation having a wavelength within the range of about 400 nanometers to about 800 nanometers. If radiation energy is employed, some pigment particles and/or other optional additives may absorb the radiation energy to inhibit polymerization of the resin in the seal coat precursor. If this is observed, higher doses of radiation energy and/or higher levels of photoinitiator can be used to the extent needed to compensate for such radiation absorbance. Also, the E-beam accelerating voltage may be increased to thereby increase penetration of the ionizing radiation energy.

Overlay Materials

Overlay film 40 (FIG. 3) of the present invention is used to provide a barrier for foreign materials such as organic solvents, water, oil, dust, etc., from attacking the structured film. Thus, the polymeric materials used in the overlay film should be generally resistant to degradation by weathering (e.g., UV light) and environmental attack so that the retroreflective sheeting can be used for generally long-term outdoor applications. They should have good adhesion to the polymeric material of the structured film and should be light transmissible. Preferably, the polymeric materials used in the overlay film are substantially transparent. In some applications it is also necessary that the overlay have good adhesion to an ink used to provide graphics or a message to the sign. The polymeric materials used in the overlay film should also preferably retain their physical integrity at the temperatures at which they are applied to the structured film.

Overlays for thermoplastic structured materials are typically bonded to the structured film after it has been thermally molded. Typically, the overlay film is a thermoplastic material. Examples of polymers that can be used in the overlay film include, but are not limited to: fluorinated polymers such as poly(chlorotrifluoroethylene), which is available, for example, under the trade designation KEL-F800 from 3M Co., St. Paul, Minn., poly(tetrafluoroethylene-co-hexafluoropropylene), which is available, for example, under the trade designation EXAC FEP from Norton Performance, Brampton, Mass., poly(tetrafluoroethylene-co-perfluoro(alkyl)vinylether), which is available, for example, under the trade designation EXAC PEA from Norton Performance, and poly(vinylidene fluoride) or poly (vinylidene fluoride-co-hexafluoropropylene), which are available, for example, under the trade designation KYNAR from Pennwalt Corporation, Philadelphia, Pa.; ionomeric ethylene copolymers such as poly(ethylene-co-methacrylic acid) with sodium or zinc ions, which are available under the trade designations SURLYN-8920 and SURLYN-9910 from E.I. duPont de Nemours, Wilmington, Del.; low density polyolefins such as low density polyethylene, linear low density polyethylene, and very low density polyethylene; plasticized vinyl halide polymers such as plasticized poly (vinylchloride); polyethylene copolymers including acid functional polymers such as poly(ethylene-co-acrylic acid) and poly(ethylene-co-methacrylic acid), poly(ethylene-co-maleic acid), and poly(ethylene-co-fumaric acid); acrylic functional polymers such as polymethylmethacrylate, poly (ethylene-co-alkylacrylates) where the alkyl group is methyl, ethyl, propyl, butyl, etc., or $CH_3(CH_2)_n$- where n is 0–12, and poly(ethylene-co-vinylacetate); and aliphatic and aromatic polyurethanes derived from diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, polydiols such as polypentylene adipate glycol, polytetramethylene ether glycol, polyethylene glycol, polycaprolactone diol, poly-1,2-butylene oxide glycol, and combinations of these polydiols, and chain extenders such as butanediol or hexanediol. Commercially available urethane polymers include those available under the trade designations PN-03 or 3429 from Morton International Inc., Seabrook, N.H., or X-4107 from B.F. Goodrich Company, Cleveland, Ohio. Combinations of the above polymers also may be used in the overlay film.

Preferred polymers for the overlay film include fluorinated polymers such as poly(vinylidene fluoride) (PVDF), acrylic functional polymers such as polymethylmethacrylate (PMMA), and combinations thereof A particularly preferred group of polymers include blends of PVDF and PMMA, which contain about 60–95 weight percent (wt-%) PMMA and about 5–40 wt-% PVDF. In these blends, the PMMA contributes to the durability of the overlay film whereas the PVDF contributes to the chemical (e.g., organic solvent) stability and flexibility of the overlay film. The PMMA may also be impact modified with, for example, a butyl acrylate rubber; however, preferably, the PMMA is not impact modified. Examples of impact modified PMMA s include those available under the trade designation CP924 from ICI Polymers, Wilmington, Del., which can be obtained with the benzotriazole UV absorber TINUVIN 900. Such nonimpact-modified PMMA materials are also referred to as "straight" PMMA. Suitable sources of "straight" PMMA include those available under the trade designation VO-45 from AtoHaas North America Inc., Bristol, Pa., and CP81 acrylic from ICI Polymers, Wilmington, Del. PVDF materials are available under the trade designations SOLVEY and SOLEF from Soltex Polymer Corp., Houston, Tex., and KYNAR from Elfatochem North America, Inc., Philadelphia, Pa. These polymers are preferred for one or more of the following reasons: suitable mechanical properties; good adhesion to the structured film; clarity; enhanced solvent inertness; and environmental stability.

The overlay film can be a single layer or a multilayer film as desired, typically having a thickness of about 10–200 micrometers. Additionally, the adhesion between the overlay film and the structured film can be improved by placing a thin tie-layer (not shown in FIG. 3) between the structured film and the overlay. Alternatively, or in addition, some type of surface treatment method may be used to enhance adhesion.

The polymeric material used in the overlay film of the present invention can include the additives discussed above with respect to the structured layer. That is, the overlay film can include acid scavengers, UV absorbers such as benzotriazoles, as well as colorants, light stabilizers, lubricants, and the like. The use of a UV absorber is particularly advantageous in the overlay film.

EXAMPLES

Features and advantages of the retroreflective sheetings according to the present invention are further illustrated in the examples. It is recognized, however, that while the examples serve this purpose, the particular ingredients and amounts used, as well as other conditions and details, are not to be construed in a manner that would unduly limit the scope of this invention. The following tests were used to evaluate samples of structured retroreflective sheeting of the present invention.

Z-Peel Test

The tensile bond Z-peel test is based on ASTM D 952-93. The specimen to be tested is attached between two metal fixtures. For the purposes of the following examples, the test was set up using an upper fixture that was a cubic block of steel 25.4 millimeters on each edge presenting a 6.5 square centimeter surface. A lower fixture was a 1.6 millimeter thick plate of aluminum, 5 centimeters by 30.5 centimeters. For the test, a 30 millimeter square piece of the retroreflective sheeting of this invention was covered on the top with a layer of a suitable pressure sensitive tape such as SCOTCH Brand Adhesive Tape No. 419 (commercially available from 3M Company, St. Paul, Minn.), and on the bottom with a pressure sensitive adhesive having a 93:7 ratio of isooctyl acrylate-acrylic acid copolymer crosslinked with a bisamide crosslinker as disclosed in U.S. Pat. No. 4,418,120 (Kealy et al.) with an intrinsic viscosity of 1.5–1.7 prior to crosslinking as measured by a modified Ostwald 50 viscometer at 20° C. using ASTM D446-93 test method (referred to below as "93:7 adhesive"). The No. 419 adhesive tape was conditioned by storing in a desiccator containing calcium carbonate for at least 24 hours prior to use. The sheeting was placed, sealing film side down on the center of the aluminum plate and the metal block was placed on the top side of the sheeting. The sheeting was then trimmed around the edges of the upper block so that a 25.4×25.4 millimeter square of the sample was tested. The assembled sandwich was then compressed with a force of 1900 Newtons for 60 seconds. The steel cube was secured in the upper jaw of a standard tensile testing machine and the aluminum plate was secured along two sides in a lower gripping fixture of the tester. The jaws were rapidly separated at 50 centimeters/minute and the force versus displacement curve was recorded and the peak force was reported.

90° Peel Test

The 90° Peel Test (also referred to herein as the T-Peel test) is based on ASTM D 1876-93. A strip of adhesive was laminated to the bottom of a sample of the structured retroreflective sheeting. The adhesive used was a pressure sensitive adhesive with a 93:7 adhesive. A tab was formed at one end of the sample using a folded-over piece of adhesive tape (SCOTCH Brand Adhesive Tape No. 898, 3M Company, St. Paul, Minn.) that covered approximately 3.8–5.1 centimeters of the sample. The sample was then mounted on an aluminum plate 7×30.5 centimeters with a nominal thickness of about 1 millimeter. A hand roller was used to establish good contact between the exposed adhesive on the sample and the substrate.

One set of the completed samples, i.e., the composites, were conditioned in a constant temperature (20° C.) and constant relative humidity (50%) room for 24 hours before testing. An alternate set of the composites were placed in a distilled water bath at 21° C. for 10 days followed by 24 hours dwell in a constant temperature (20° C.) and humidity (50% relative humidity) room. For testing, each composite was mounted in a constant strain testing machine (e.g., machines marketed under the tradenames SINTECH or INSTRON) that separated the sample from the substrate at approximately a 90° angle. The sample and substrate were held by a jig that ensured that the sample and substrate moved laterally while the jaws of the machine moved vertically, thereby maintaining the releasing edge of the sample/substrate composite generally centered between the jaws of the tensile strength testing machine.

The preferred jig comprised a "ball slide" (available from McMaster-Carr, Chicago, Ill.) having a movable bed attached to a base. A post extended at a right angle from the bottom of the base. The composite, i.e., sample mounted on the substrate, was attached to the movable bed and the tab formed at one end of the sample was clamped in the upper jaw of the tensile strength testing machine while the post was clamped in the lower jaw. The jaws were then separated at 30.5 centimeters/minute and the force required to effect the separation between the sample and substrate was noted. This measures the force required to delaminate the sealing film/seal coat composite from the structured film.

Water Holdout

This test method is an evacuated immersion method to evaluate the extent to which the process conditions yielded a hermetic seal. The equipment consisted of one 200–250 millimeter inside diameter PYREX glass desiccator, vacuum pump, (0–1.0×10$^5$ Pascals) vacuum gauge, valve and associated vacuum tubing, liquid dish soap (mild surfactant), and approximately 50-gram weight.

The desiccator was filled half full with tap water and 4–6 drops of the liquid dish soap was added. The test was run at room temperature (typically about 20°–25° C.). The sample was immersed in the soap solution and held submerged by the 50-gram weight. The desiccator was closed and the vacuum pump attached to the nozzle of the desiccator lid with a vacuum hose containing a gauge and a bleeder valve. The pressure in the desiccator was reduced to 85×10$^3$ Pascals below ambient pressure and maintained for one minute. The vacuum pump was then turned off and the bleeder valve was opened to allow air into the desiccator until the pressure was equalized to that of atmospheric pressure. The desiccator was opened and the sample removed. The amount of water intrusion into the cells of the construction was noted. An "excellent" rating is one where only the open cells on the perimeter had been flooded with water.

Accelerated Weathering

In order to quantify the retention of retroreflective brightness and peel adhesion after exposure to ultraviolet (UV) radiation, samples were placed in a Fluorescent UV Condensation Device (Q-Panel Co., Westlake, Ohio) according to ASTM procedure No. G-53 with UV lamps having a peak emission at 340 nanometers, cycling from 20 hours light at 75° C. and 4 hours dark at 50° C., repeating for various exposure times.

Brightness

The brightness was measured according to ASTM Method E 810-94 at the entrance angle of –4° and an observation angle of –0.2°, when the sheeting is in a planar configuration (i.e., laying flat) using a 553 Retroluminometer (Ser. No. 474764).

Humidity and Temperature Cycling (Blue M Cycle Chamber)

In order to quantify the retention of peel strength during repeated exposure to temperature and humidity cycles, samples of retroreflective sheetings were prepared 5 centimeters wide and 15 centimeters long and adhesively mounted using a pressure sensitive adhesive with a 93:7 adhesive. The samples were placed in slotted panel holders which held the panels 90° from the horizontal. The panel holders were then placed in a Blue M Cycle Chamber produced by General Signal Corporation, Stamford, Conn. The Blue M Cycle Chamber was programmed to cycle from 60° C. to –40° C. in an 8 hour period. At 60° C., the chamber was maintained at 92% relative humidity (RH) for one hour. The samples were removed from the chamber after 1000 hours and the 90° Peel Adhesion measured.

Example 1

Retroreflective Sheeting Having Rivet-Like Connection Between Cube-Corner Elements and Sealing Film Cube-corner films with attached overlays were made as follows. Molten polycarbonate resin (MAKROLON 2407 supplied by Mobay Corp., Pittsburgh, Pa.) was cast onto a heated microstructured nickel tooling containing microcube prism recesses having a depth of approximately 175 micrometers. The microcube recesses were formed as matched pairs of cube-corner elements with the optical axis canted or tilted 9.2° away from the primary groove, as generally described in U.S. Pat. No. 4,588,258 (Hoopman). The nickel tooling thickness was 508 micrometers and the tooling was heated to 216° C. Molten polycarbonate at a temperature of 288° C. was cast onto the tooling at a pressure of approximately 1.03×10$^7$ Pascals to 1.38×10$^7$ Pascals for 0.7 second in order to replicate the microcube recesses. Coincident with filling the microcube recesses, additional polycarbonate was deposited in a continuous layer above the tooling to form a land with a thickness of approximately 150 micrometers. The total cube-corner film was approximately 330 micrometers thick.

A previously extruded 50 micrometer thick impact modified, continuous, poly(methylmethacrylate) overlay film (60% PLEXIGLASS VO-45 poly(methylmethacrylate) modified with 40% DR-100 crosslinked impact particles made from butyl acrylate rubber, supplied by AtoHaas North America Inc., Bristol, Pa.) was then laminated onto the top surface of the continuous land layer when the surface temperature was approximately 190.6° C. The combined tooling with laminated polycarbonate and poly (methylacrylate) overlay was then cooled with room temperature air for 18 seconds to a temperature of 71°–88° C. allowing the laminate materials to solidify. The laminate sample was then removed from the microstructured tooling.

Sealing films with a nominal thickness of 50 micrometers were made by the methods described in copending U.S. patent application Ser. No. 08/626,709, entitled EXTRUDING THIN MULTIPHASE POLYMER FILMS (Attorney Docket No. 52496USA3A), filed Apr. 1, 1996. Four sealing films ("SF1"–"SF4") were prepared in this manner and are listed below in Table 2.

TABLE 2

| | Sealing Films | |
|---|---|---|
| Sealing Film | Resin Trade Designation | Chemistry |
| SF1 | CENTREX 833 (marine white) | ASA/AES terpolymer blend |
| SF2 | CENTREX 401 (neutral) | AES |
| SF3 | PULSE 1350 | Polycarbonate/ABS blend |
| SF4 | CYOLAC GPX 3800 | ABS |

The cube-corner film with attached overlay was fed into a nip between a steel embossing roller and a 60 durometer rubber roller with the previously extruded sealing film. The sealing film was protected by a 13-micrometer polyethylene terephthalate film next to the steel embossing roller. The embossing pattern was of a chain link configuration. The embossing roller surface temperature was about 220° C. and the rubber nip roller surface temperature was about 200° C. The pressure of the nip was supplied by two 7.6-centimeter hydraulic pistons, capable of pressures ranging from about 3.5×10$^4$ Pascals to about 17.24×10$^4$ Pascals, one for each end of the rubber roller. The rubber nip roller was about 25 centimeters in diameter and the steel embossing roller was 40 centimeters in diameter. The pressure was distributed over the width of the sample, which was 30.5 centimeters wide.

The process web speed and the force on the nip were varied to obtain desirable water holdout. For SF1, the process web speed was 3 meters/minute, the indicating pressure of the nip was 8.08×10⁵ Pascals, and the rubber nip roller surface temperature was 216° C. For SF2, the process web speed was 4 meters/minute, the indicating pressure of the nip was 6.99×10⁵ Pascals, and the rubber nip roller surface temperature was 216° C. For SF3, the process web speed was 3 meters/minute, the indicating pressure of the nip was 1.19×10⁶ Pascals, and the rubber nip roller surface temperature was 216° C. For SF4, the process web speed was 4 meters/minute, the indicating pressure of the nip was 1.05×10⁶ Pascals, and the rubber nip roller surface temperature was 216° C.

Following lamination, the construction was cooled to about 10° C. using chill rollers. The polyethylene terephthalate protective layer was then removed from the sample and the thickness of the completed construction was determined. The brightness, water holdout, and 90° Peel Adhesion were then evaluated. For each construction, the initial water holdout was excellent. The brightness for each construction is reported as an average of 6–8 readings in units of candela/lux/square meter: SF1, 1088; SF2, 1205; SF3, 1000; and SF4, 899. A summary of retention of 90° Peel Adhesion after accelerated weathering, outdoor weathering in Florida and Arizona, humidity and temperature cycling using the Blue M Cycle Chamber, and 10 day water soak is given below in Table 3.

TABLE 3

Percent Retention of 90° Peel Adhesion After Accelerated and Outdoor Weathering

| Sealing Film | 3000 Hours Accelerated | 12 Months Arizona | 12 Months Florida | 3000 Hours Blue M Cycle | 10 Day Water Soak |
|---|---|---|---|---|---|
| SF1 | 114% | 94% | 88% | 96% | 118% |
| SF2 | 120% | 122% | 126% | 87% | 133% |
| SF3 | 3% | — | — | — | — |
| SF4 | 2% | — | — | — | — |

Constructions using sealing films SF1 and SF2 had good retention of bond strength (i.e., peel adhesions) in these tests. Certain of this data represents an increase in 90° Peel Adhesion with time (i.e., having percent retentions of greater than 100%). This is believed to result from an increase in crosslink density, and hence molecular weight, of the sealing film with time.

Constructions using sealing films SF3 and SF4 were found to have poor bond strength (i.e., peel adhesion retention during accelerated weathering and were not studied in the other exposures. Although sealing films SF3 and SF4 did not weather as well as sealing films SF1 and SF2, it is believed that their weathering characteristics could be improved with various additives, such as UV stabilizers, etc., and/or with the use of a seal coat.

Example 2

Retroreflective Sheeting Having Rivet-Like Connection Between Cube-Corner Elements and Sealing Film with Solvent-Borne Seal Coat Cube-corner films with attached overlays were prepared as described in Example 1. Sealing film SF1 was extruded and thermally embossed to the cube-corner films as described in Example 1. Two samples were prepared, one for application of a seal coat and one for comparison testing.

A seal coat solution was prepared following Example 2 in U.S. Pat. No. 4,025,159 (McGrath). The solution included 150 parts by weight of a thermoplastic acrylic terpolymer (52.5% methyl methacrylate, 43% ethyl acrylate, and 4.5% isooctyl acrylate) dissolved in xylene at 33.3% solids, 33 parts by weight tetraethylene glycol diacrylate (SARTOMER 268), 42 parts by weight rutile $TiO_2$ (R960) pigment from DuPont de Nemours, and 0.45 part by weight stearic acid.

The seal coat solution was coated on the sealing film side of the composite sheeting using a notch bar coater. A coated sample was dried at 150° C. for 10 minutes and passed through an E-beam processor at 6 meters/minute. The following cure conditions were used: 175 KV, 5.88 milliamps to provide 5 Mrad of irradiation using an Electro Curtain Model CB 300/45/380, manufactured by Energy Sciences, Inc., Wilmington, Mass.

The constructions were adhesively bonded to aluminum test panels and exposed to the accelerated weathering test described above. Percent retention of initial 90° Peel Adhesion is given below in Table 4.

TABLE 4

Percent Retention of 90° Peel Adhesion After Accelerated Weathering

| Sample | 1000 Hours | 2000 Hours | 3000 Hours | 4000 Hours |
|---|---|---|---|---|
| No Seal Coat | 97% | 78% | 101% | 78% |
| Seal Coat | 107% | 103% | 92% | 102% |

Example 3

Retroreflective Sheeting Having Rivet-Like Connection Between Cube-Corner Elements and Sealing Film with 100% Solids Seal Coat Cube-corner films with attached overlays were prepared as described in Example 1. Seal film SF1 was extruded and thermally embossed to the cube-corner film as described in Example 1. A variety of aliphatic urethane diacrylates (UDA) were used in the seal coat formulations listed in Table 5. The aliphatic urethane acrylates used were as follows: "UDA-1," PHOTOMER 6010 (MW=1500, Henkel Corp., Hoboken, N.J.); "UDA-2," S-9635 (25% by weight isobornyl acrylate, Sartomer Co., West Chester, Pa.); "UDA-3," S-9645 (25% by weight isobornyl acrylate, Sartomer Co.); "UDA-4," S-9655 (25% by weight isobornyl acrylate, Sartomer Co.); "UDA-5," S-963-B80 (20% by weight 1,6-hexanediol diacrylate, Sartomer Co.); "UDA-6," S-966-A80 (20% by weight tripropylene glycol diacrylate, Sartomer Co.); "UDA-7," EBECRYL 284 (MW=1200, containing 12% by weight 1,6-hexanediol diacrylate, UCB Radcure Inc., Smyrna, Ga.); and "UDA-8," EBECRYL 8402 (MW=1000, UCB Radcure Inc., Smyrna, Ga.). The values in Table 5 are in grams. The formulations also contained CENTREX 833 ("833") AES/ASA terpolymer, SARTOMER 285 ("S-285") tetrahydroxy furfuryl acrylate, and 1% by weight of a photoinitiator available under the trade designation DAROCURE 4265 (50:50 blend of 2-hydroxy-2-methyl-1-phenylpropan-1-one and 2,4,6-trimethylbenzoyldiphenylphosphine oxide) available from Ciba-Geigy Corp., Hawthorne, N.Y. There was no pigment other than that included in the CENTREX 833.

TABLE 5

| Seal Coat | UD A-1 | UD A-2 | UD A-3 | UD A-4 | UD A-5 | UD A-6 | UD A-7 | UD A-8 | "833" | "S-285" |
|---|---|---|---|---|---|---|---|---|---|---|
| SC-1 | | | | | | | | 50 | 12.5 | 37.5 |
| SC-2 | | | | | | | | 43 | 14.3 | 42.7 |
| SC-3 | | | | | | | | 33 | 16.8 | 50.2 |
| SC-4 | | | | | | | | 10 | 22.5 | 67.5 |
| SC-5 | | | | | | | 10 | | 22.5 | 67.5 |
| SC-6 | | | | | | 10 | | | 22.5 | 67.5 |
| SC-7 | | | | | 10 | | | | 22.5 | 67.5 |
| SC-8 | | | | | 33 | | | | 16.8 | 50.2 |
| SC-9 | | | | | 43 | | | | 14.3 | 42.7 |
| SC-10 | | | | 10 | | | | | 22.5 | 67.5 |
| SC-11 | | | | 33 | | | | | 16.8 | 50.2 |
| SC-12 | | | 10 | | | | | | 22.5 | 67.5 |
| SC-13 | | | 33 | | | | | | 16.8 | 50.2 |
| SC-14 | | | 43 | | | | | | 14.3 | 42.7 |
| SC-15 | | 10 | | | | | | | 22.5 | 61.5 |
| SC-16 | | 33 | | | | | | | 16.8 | 50.2 |
| SC-17 | | 43 | | | | | | | 14.3 | 42.7 |
| SC-18 | 10 | | | | | | | | 22.5 | 67.5 |

The sealing film side of the composite sheeting was coated with the various seal coat formulations using a No. 3 wire-wound coating rod (RD Specialties, Webster, N.Y.) to provide a wet coating caliper of about 12 micrometers. The seal coat was then cured by multiple passes through an American Ultraviolet UV Processor Model C38/300/2W (American Ultraviolet, Murray Hill, N.J.) with two medium pressure Hg bulbs each at 300 watts. The processor speed was 33 meters/minute.

The seal-coated samples were then mounted on aluminum panels and tested for 90°Peel Adhesion. The increase in the 90° Peel Adhesion of the seal-coated samples over the control (no seal coat) are given in Table 6.

TABLE 6

Percent Increase in 90° Peel Adhesion of Seal-Coated Samples

| Seal Coat Formulation | Percent Increase over Control | Seal Coat Formulation | Percent Increase over Control |
|---|---|---|---|
| SC-1 | 267% | SC-10 | 108% |
| SC-2 | 267% | SC-11 | 220% |
| SC-3 | 170% | SC-12 | 188% |
| SC-4 | 180% | SC-13 | 265% |
| SC-5 | 111% | SC-14 | 202% |
| SC-6 | 113% | SC-15 | 126% |
| SC-7 | 129% | SC-16 | 239% |
| SC-8 | 221% | SC-17 | 237% |
| SC-9 | 275% | SC-18 | 130% |

All samples showed considerably increased adhesion to the cube-corner film when the seal coat was employed relative to the sealing film alone.

Example 4

Retroreflective Sheeting Having Rivet-Like Connection Between Cube-Corner Elements and Sealing Film with Pigmented Seal Coat (100% Solids)

Cube-corner films with attached overlays were prepared as described in Example 1, except that a fluorescent dye was included. Sealing film SF1 was extruded and thermally embossed to the cube-corner film as described in Example 1.

The seal coats described below in Table 7 were prepared by mixing the listed components (UDA-8 is described above in Example 2; "833" refers to CENTREX 833 AES/ASA terpolymer; "S-285" refers to SARTOMER 285 tetrahydroxy furfuryl acrylate; and $TiO_2$ grind is available from Penn Color, Doylestown, Pa., under the trade designation 9WJ, which includes neopentyl glycol diacrylate and rutile $TiO_2$ (R960) from DuPont), and were coated on the sealing film side of the composite sheeting as described in Example 3 and cured using a Fusion V bulb (400 watts) with four passes at 16 meters/minute.

TABLE 7

Seal Coat Formulations

| Seal Coat | UDA-8 (wt-%) | $TiO_2$ Grind (wt-%) | "833" (wt-%) | "S-285" (wt-%) |
|---|---|---|---|---|
| SC-19 | 0.6 | 0.15 | 0.00 | 0.25 |
| SC-20 | 0.6 | 0.05 | 0.03 | 0.33 |
| SC-21 | 0.6 | 0.25 | 0.03 | 0.13 |
| SC-22 | 0.6 | 0.25 | 0.00 | 0.15 |
| SC-23 | 0.3 | 0.25 | 0.05 | 0.40 |
| SC-24 | 0.3 | 0.25 | 0.05 | 0.40 |
| SC-25 | 0.5 | 0.25 | 0.00 | 0.25 |
| SC-26 | 0.6 | 0.05 | 0.06 | 0.29 |
| SC-27 | 0.6 | 0.05 | 0.06 | 0.29 |
| SC-28 | 0.45 | 0.05 | 0.06 | 0.44 |
| SC-29 | 0.45 | 0.25 | 0.06 | 0.24 |
| SC-30 | 0.6 | 0.05 | 0.05 | 0.32 |
| SC-31 | 0.53 | 0.05 | 0.05 | 0.39 |
| SC-32 | 0.6 | 0.175 | 0.05 | 0.19 |
| SC-33 | 0.53 | 0.25 | 0.05 | 0.19 |
| SC-34 | 0.4 | 0.25 | 0.03 | 0.33 |
| SC-35 | 0.53 | 0.05 | 0.06 | 0.37 |
| SC-36 | 0.53 | 0.18 | 0.06 | 0.24 |
| SC-37 | 0.4 | 0.19 | 0.05 | 0.36 |
| SC-38 | 0.5 | 0.18 | 0.04 | 0.30 |

The seal-coated samples were then mounted on aluminum panels and tested for 90° Peel Adhesion, Z-Peel, and brightness. The results are listed below in Table 8. The 90° Peel Adhesion and Z-Peel are reported as a percentage increase relative to the control, which did not include the seal coat. The brightness results are reported in candela/lux/meters squared.

TABLE 8

Test Results of Seal-Coated Samples

| Seal Coat Formulation | % Increase Over Control | | Brightness |
|---|---|---|---|
| | 90° Peel | Z-Peel | |
| SC-19 | 137% | 142% | 358 |
| SC-20 | 147% | 139% | 372 |
| SC-21 | 103% | 127% | 413 |
| SC-22 | 133% | 145% | 432 |
| SC-23 | 85% | 117%. | 394 |
| SC-24 | 95% | 114% | 334 |
| SC-25 | 140% | 139% | 424 |
| SC-26 | 147% | 149% | 420 |
| SC-27 | 166% | 144% | 391 |
| SC-28 | 129% | 133% | 370 |
| SC-29 | 1.61% | 150% | 329 |
| SC-30 | 154% | 136% | 375 |
| SC-31 | 144% | 139% | 368 |
| SC-32 | 152% | 154% | 383 |
| SC-33 | 150% | 144% | 386 |
| SC-34 | 123% | 135% | 450 |
| SC-35 | 126% | 134% | 417 |
| SC-36 | 151% | 144% | 347 |
| SC-37 | 104% | 124% | 400 |
| SC-38 | 146% | 122% | 384 |
| Control | — | — | 393 |

The patents, patent documents, and publications cited herein are incorporated by reference in their entirety, as if each were individually incorporated by reference. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A retroreflective sheeting comprising:
   a) a structured film comprising an array of structured elements; and
   b) a sealing film attached to the structured film by a plurality of rivet-like connections, wherein a first side of the sealing film faces the structured elements and a second side faces away from the structured elements, and further wherein each of the rivet-like connections comprises a perforation in the sealing film through which a portion of the structured film protrudes to attach the sealing film to the structured film.

2. A retroreflective sheeting according to claim 1, wherein the portion of the structured film protruding through the perforation in at least one of the rivet-like connections expands to form a flange.

3. A retroreflective sheeting according to claim 1, wherein the rivet-like connections are generally located in a predetermined pattern.

4. A retroreflective sheeting according to claim 1, wherein the structured film further comprises a land.

5. A retroreflective sheeting according to claim 1, wherein the structured film further comprises a raised structure extending between the structured film and the sealing film, and further wherein the rivet-like connections are formed on the raised structure.

6. A retroreflective sheeting according to claim 5, wherein the portion of the structured film protruding through the perforation in at least one of the rivet-like connections expands to form a flange.

7. A retroreflective sheeting according to claim 5, wherein the raised structure further comprises one or more ridges.

8. A retroreflective sheeting according to claim 5, wherein the raised structure further comprises one or more ridges located in a predetermined pattern.

9. A retroreflective sheeting according to claim 5, wherein the raised structure further comprises elements for perforating the sealing film.

10. A retroreflective sheeting according to claim 1, wherein the sealing film comprises a thermoplastic polymer.

11. A retroreflective sheeting according to claim 1, wherein the sealing film has a ductile yield of at least about 20%.

12. A retroreflective sheeting according to claim 11, wherein the sealing film comprises a thermoplastic polymer selected from the group consisting of cast polyethers, cast polyesters, cast polyamides, ionomeric ethylene copolymers, plasticized vinyl halide polymers, styrene-acrylonitrile copolymers, poly-alpha-olefins, ethylene-propylene-diene copolymers, and combinations or blends thereof.

13. A retroreflective sheeting according to claim 12, wherein the sealing film comprises a thermoplastic polymer selected from the group consisting of ethylene-propylene-nonconjugated diene ternary copolymers grafted with a mixture of styrene and acrylonitrile, styrene-acrylonitrile graft copolymers, acrylonitrile-butadiene-styrene graft copolymers, extractable styrene-acrylonitrile copolymers, and combinations or blends thereof.

14. A retroreflective sheeting according to claim 12, further comprising a seal coat on the second side of the sealing film.

15. A retroreflective sheeting according to claim 14, wherein the seal coat is prepared from a seal coat precursor comprising a thermally curable component.

16. A retroreflective sheeting according to claim 14, wherein the seal coat is prepared from a seal coat precursor comprising a radiation curable component.

17. A retroreflective sheeting according to claim 16, wherein the radiation curable component comprises a cationic curable resin, a free radical curable resin, or mixtures thereof.

18. A retroreflective sheeting according to claim 16, wherein the radiation curable component comprises a dual-cure resin or a hybrid-cure resin.

19. A retroreflective sheeting according to claim 16, wherein the radiation curable component comprises an acrylate.

20. A retroreflective sheeting according to claim 19, wherein the acrylate is selected from the group consisting of an acrylated epoxy, an acrylated polyester, an acrylated aromatic or aliphatic urethane, an acrylated acrylic, an acrylated silicone, an acrylated polyether, a vinyl acrylate, and an acrylated oil.

21. A retroreflective sheeting according to claim 20, wherein the acrylate is an acrylated aliphatic or aromatic urethane.

22. A retroreflective sheeting according to claim 21, wherein the acrylate is an acrylated aliphatic urethane.

23. A retroreflective sheeting according to claim 22, wherein the seal coat precursor further comprises a monofunctional or multifunctional reactive monomer.

24. A retroreflective sheeting according to claim 23, wherein the monofunctional or multifunctional reactive monomer is an acrylate monomer.

25. A retroreflective sheeting according to claim 16, wherein the seal coat precursor comprises a reactive diluent and a film former.

26. A retroreflective sheeting according to claim 25, wherein the reactive diluent comprises a monofunctional or multifunctional acrylate monomer.

27. A retroreflective sheeting according to claim 25, wherein the film former comprises a thermoplastic polymer.

28. A retroreflective sheeting according to claim 25, wherein the film former comprises a monofunctional or multifunctional acrylate oligomer.

29. A retroreflective sheeting according to claim 25, wherein the seal coat precursor further comprises a multiphase styrenic thermoplastic copolymer.

30. A retroreflective sheeting comprising:
   a) a cube-corner film comprising an array of cube-corner elements; and
   b) a sealing film attached to the cube-corner film by a plurality of rivet-like connections, wherein:
      (i) each of the rivet-like connections comprises a perforation in the sealing film through which a portion of the cube-corner film protrudes to attach the sealing film to the cube-corner film; and
      (ii) the sealing film comprises a multiphase styrenic thermoplastic copolymer.

31. A retroreflective sheeting according to claim 30, wherein the sealing film thickness is less than about 250 micrometers.

32. A retroreflective sheeting according to claim 30, wherein the multiphase styrenic thermoplastic copolymer is selected from the group consisting of ethylene-propylene-nonconjugated diene ternary copolymers grafted with a mixture of styrene and acrylonitrile, styrene-acrylonitrile graft copolymers, acrylonitrile-butadiene-styrene graft copolymers, extractable styrene-acrylonitrile copolymers, and combinations or blends thereof.

33. A retroreflective sheeting according to claim 30, further comprising a seal coat on the second side of the sealing film.

34. A retroreflective sheeting according to claim 33, wherein the seal coat is prepared from a seal coat precursor comprising a radiation curable component.

35. A retroreflective sheeting according to claim 34, wherein the seal coat precursor comprises a reactive diluent and a film former.

36. A retroreflective sheeting according to claim 35, wherein the reactive diluent comprises a monofunctional or multifunctional acrylate monomer.

37. A retroreflective sheeting according to claim 35, wherein the film former comprises a monofunctional or multifunctional acrylate oligomer.

38. A retroreflective sheeting according to claim 37, wherein the radiation curable seal coat precursor further comprises a multiphase styrenic thermoplastic copolymer.

39. A method of manufacturing retroreflective sheeting comprising:
   a) providing a structured film comprising an array of structured elements; and
   b) attaching a sealing film to the structured film by forming a plurality of rivet-like connections between the structured film and the sealing film, wherein the structured film perforates the sealing film to form each of the rivet-like connections.

40. A method according to claim 39, wherein the step of attaching further comprises forming a flange in at least one of the rivet-like connections.

41. A method according to claim 39, wherein the step of attaching further comprises forming the rivet-like connections in a predetermined pattern.

42. A method according to claim 39, wherein the sealing film comprises a thermoplastic polymer.

43. A method according to claim 39, wherein the sealing film has a ductile yield of at least about 20%.

44. A method according to claim 39, wherein the sealing film comprises a thermoplastic polymer selected from the group consisting of cast polyethers, cast polyesters, cast polyamides, ionomeric ethylene copolymers, plasticized vinyl halide polymers, styrene-acrylonitrile copolymers, poly-alpha-olefins, ethylene-propylene-diene copolymers, and combinations or blends thereof.

45. A method according to claim 44, further comprising the step of providing a seal coat precursor on the second side of the sealing film.

46. A method according to claim 45, wherein the seal coat precursor comprises a radiation curable component.

47. A method according to claim 45, further comprising the step of curing the seal coat precursor using E-beam radiation.

* * * * *